(12) United States Patent
Ueguchi et al.

(10) Patent No.: US 12,603,538 B2
(45) Date of Patent: Apr. 14, 2026

(54) ROTATING ELECTRIC MACHINE SYSTEM

(71) Applicant: HONDA MOTOR CO., LTD., Tokyo (JP)

(72) Inventors: Satoshi Ueguchi, Wako (JP); Gen Nakamura, Wako (JP); Hiroyasu Koen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 18/448,314

(22) Filed: Aug. 11, 2023

(65) Prior Publication Data

US 2024/0055932 A1 Feb. 15, 2024

(30) Foreign Application Priority Data

Aug. 12, 2022 (JP) ................................. 2022-128757

(51) Int. Cl.
| | |
|---|---|
| *H02K 5/18* | (2006.01) |
| *F02C 6/00* | (2006.01) |
| *H02K 1/32* | (2006.01) |
| *H02K 5/173* | (2006.01) |
| *H02K 5/20* | (2006.01) |
| *H02K 7/18* | (2006.01) |

(52) U.S. Cl.
CPC ................. *H02K 5/18* (2013.01); *H02K 1/32* (2013.01); *H02K 5/1732* (2013.01); *H02K 5/203* (2021.01); *H02K 7/1823* (2013.01); *F02C 6/00* (2013.01)

(58) Field of Classification Search
CPC .......... F02C 6/00; H02K 1/32; H02K 5/1732; H02K 5/18; H02K 5/203; H02K 5/207; H02K 7/1823; H02K 9/06
See application file for complete search history.

(56) References Cited

U.S. PATENT DOCUMENTS

| | | | | | |
|---|---|---|---|---|---|
| 2008/0246281 A1* | 10/2008 | Agrawal | ............... | F01D 15/005 |
| | | | | | 415/177 |
| 2023/0155454 A1* | 5/2023 | McClelland | ............. | H02K 3/24 |
| | | | | | 310/54 |

FOREIGN PATENT DOCUMENTS

| | | |
|---|---|---|
| JP | 2006-333660 A | 12/2006 |
| JP | 2016-176349 A | 10/2016 |
| JP | 2019-214257 A | 12/2019 |
| JP | 2020-058194 A | 4/2020 |

OTHER PUBLICATIONS

Japanese Office Action Corresponding to JP Application No. 2022-128757, dated Sep. 2, 2025, 10 pages.

* cited by examiner

*Primary Examiner* — Christopher M Koehler
*Assistant Examiner* — Ethan Nguyen Vo
(74) *Attorney, Agent, or Firm* — Rankin, Hill & Clark LLP

(57) ABSTRACT

A rotor of a rotating electric machine system is equipped with cooling passages and gas flow passages through which compressed air for cooling flows. The rotating electric machine system is equipped with a rectifying structure having a plurality of fins that are capable of rectifying the flow of the compressed air. The rectifying structure is fixed to a non-rotating portion inside a main housing. The rectifying structure faces toward the cooling passages and the gas flow passages.

13 Claims, 15 Drawing Sheets

10

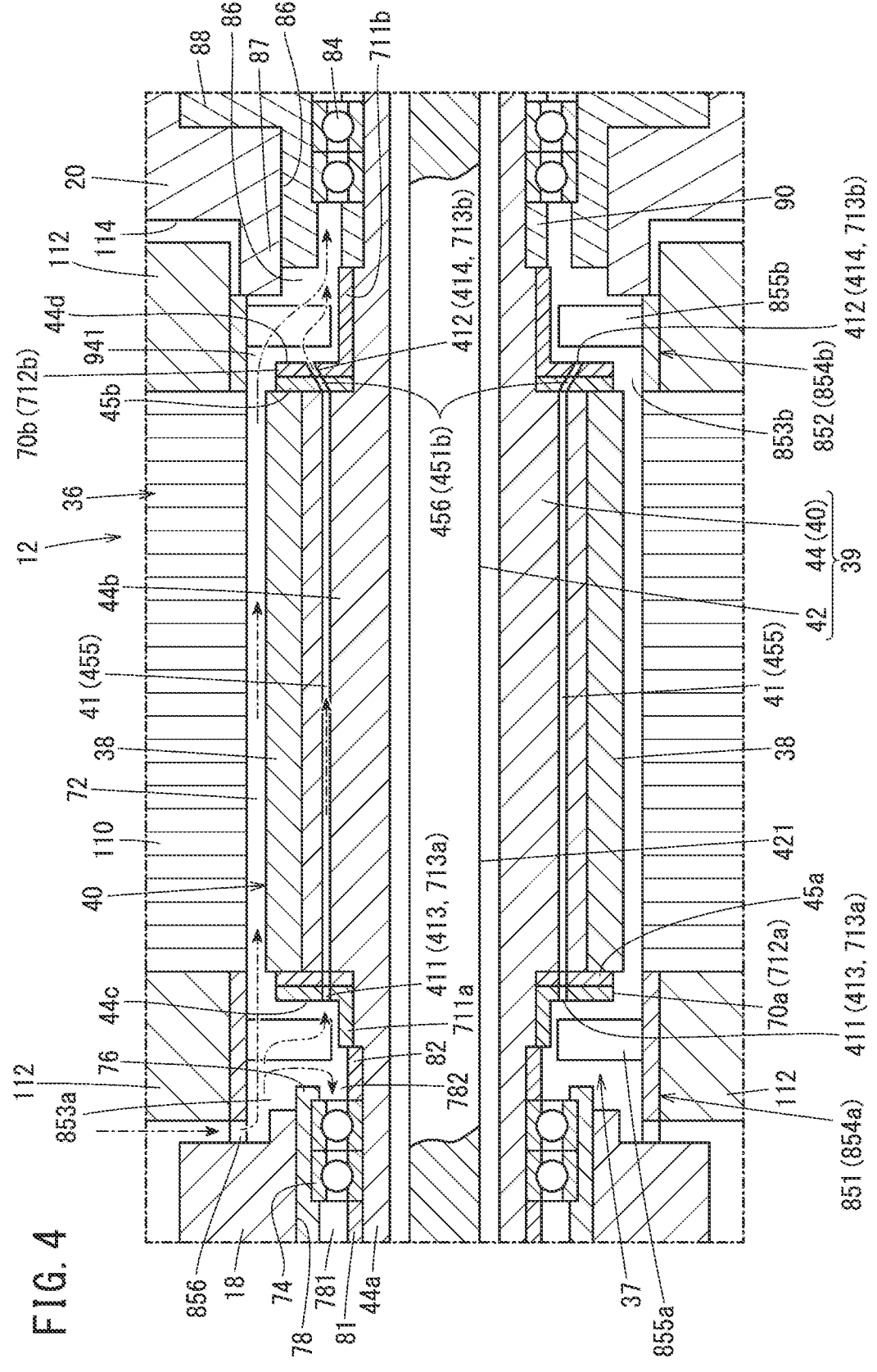
F I G. 4

F I G. 5
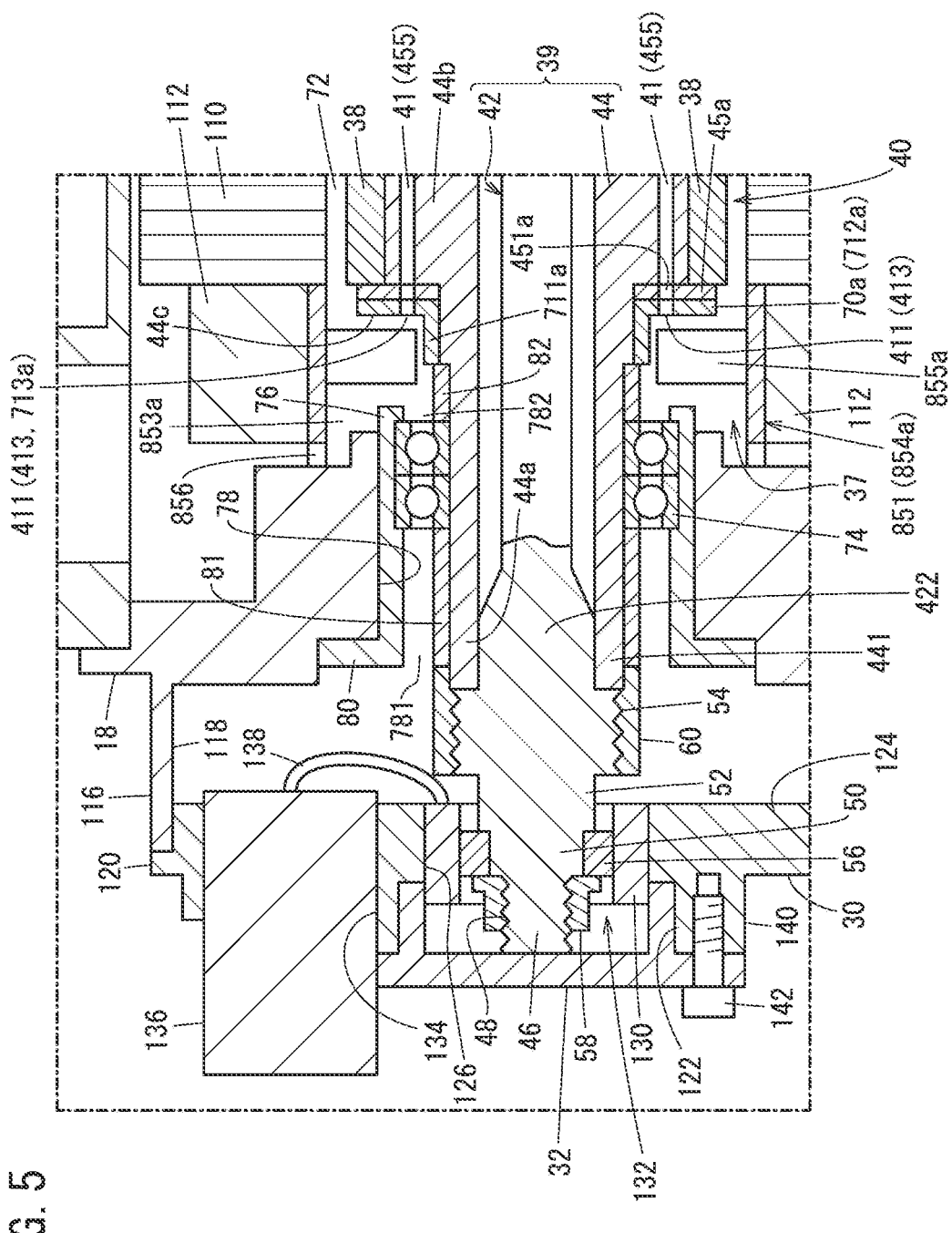

DIRECTION OF ROTATION R

DIRECTION OF ROTATION R

ROTATING ELECTRIC MACHINE SYSTEM

CROSS-REFERENCE TO RELATED APPLICATIONS

This application is based upon and claims the benefit of priority from Japanese Patent Application No. 2022-128757 filed on Aug. 12, 2022, the contents of which are incorporated herein by reference.

BACKGROUND OF THE INVENTION

Field of the Invention

The present invention relates to a rotating electric machine system equipped with a rotor and a stator, wherein the rotor is rotationally driven by being supplied with electrical power.

Description of the Related Art

In JP 2019-214257 A, a rotating electric machine system is disclosed having a stator and a rotor. The rotor comprises an air passage in the interior of a rotor shaft. The air passage includes an introduction opening portion through which air is introduced, and a lead out opening portion through which the air is led out. The introduction opening portion opens on one end part of the rotor shaft. A plurality of fins are disposed in the interior of the introduction opening portion.

When electrical power is supplied to the rotating electric machine system and the rotor rotates, accompanying the rotation of the rotor, air passes through the plurality of fins, and is forcibly drawn into the air passage from the introduction opening portion. When the air flows along the air passage to the outlet opening portion, heat is exchanged between the heated rotor (the rotor shaft) and the air, and thereby the rotor is cooled.

SUMMARY OF THE INVENTION

In the rotating electric machine system disclosed in JP 2019-214257 A, as the rotor rotates, air is forcibly introduced into the interior of the air passage by the plurality of fins. However, in the case that the air is drawn into the cooling passage at a predetermined flow rate, it is necessary to make the outer diameter of the fins large in scale. Increasing the outer diameter of the fins poses a problem in that the rotor shaft in which the fins are accommodated becomes large in scale in the radial direction. By accommodating the plurality of fins in the interior of the rotor shaft, vibrations are generated when the rotor shaft is rotated at a high speed.

An aspect of the present invention is characterized by a rotating electric machine system including a rotor provided with a magnet, a stator configured to surround the rotor, a housing in which the rotor and the stator are accommodated, and configured to rotatably support the rotor, wherein, on at least one of an interior or an outer circumferential portion of the rotor, a cooling passage is provided through which there flows a cooling gas supplied from a gas supplying mechanism which is provided separately from the rotor, the rotating electric machine system further including a rectifying structure including a plurality of fins configured to rectify flow of the gas, and the rectifying structure is fixed to a non-rotating portion inside the housing in a manner so as to face toward the cooling passage.

According to the present invention, in comparison with a structure in which fins are provided in the interior of the rotor, it is possible to suppress an increase in size in the radial direction of the rotor, and together therewith, to suppress the generation of vibrations at a time when the rotor is rotated. Further, since the gas is rectified by the rectifying structure, the gas can be smoothly made to flow to the cooling passage of the rotor.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is an enlarged cross-sectional view of a vicinity of a rotating shaft of the rotating electric machine system shown in FIG. 3;

FIG. 5 is an enlarged view of principal components showing the vicinity of an inlet side rectifying member of the rotating electric machine system shown in FIG. 3;

DETAILED DESCRIPTION OF THE INVENTION

Figure 1:
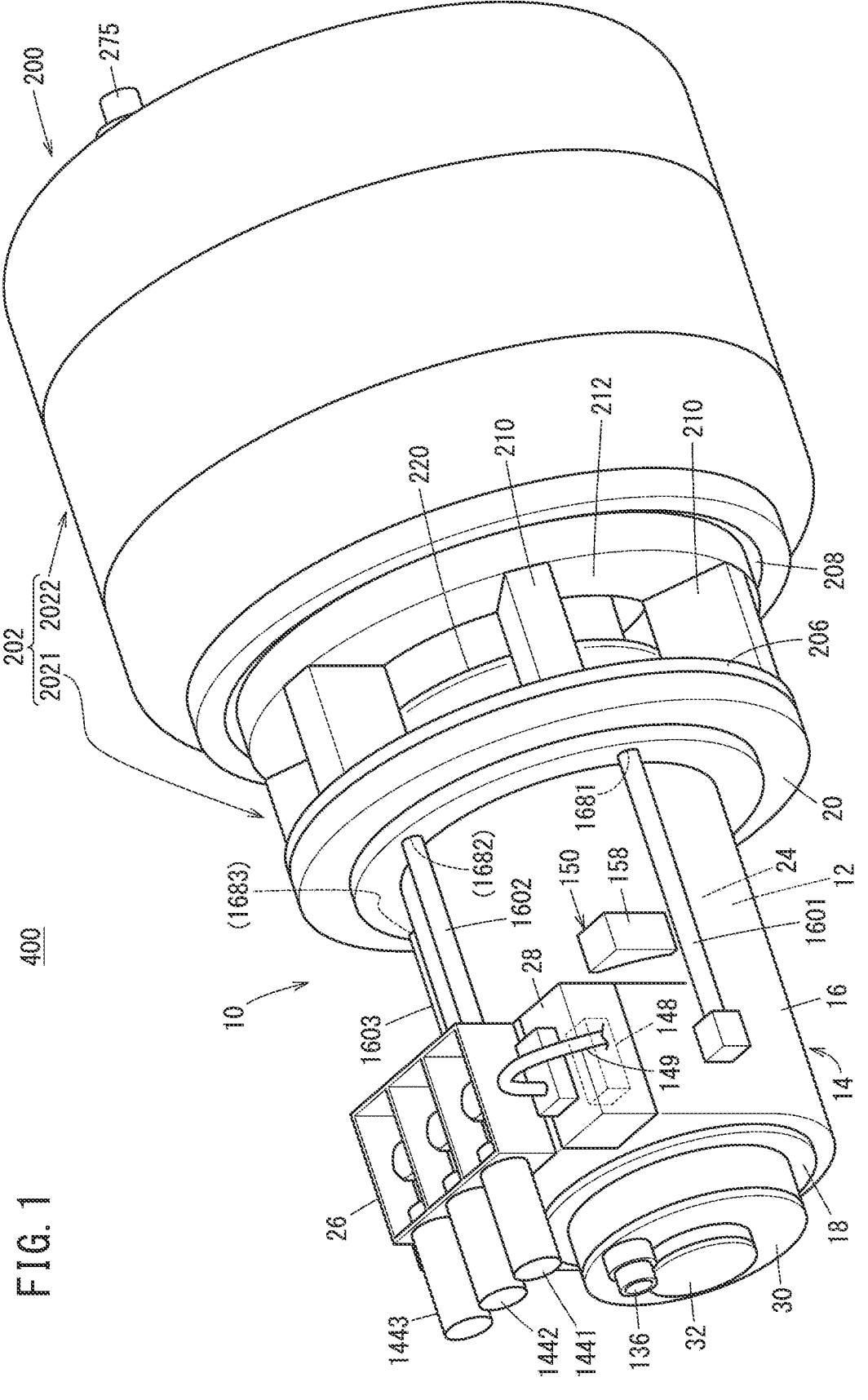
FIG. 1 is an external perspective view of a combined power system including a rotating electric machine system according to an embodiment of the present invention.

As shown in FIG. 1, a rotating electric machine system 10 according to a present embodiment is used in a combined power system 400 that is integrally combined with an internal combustion engine. FIG. 1 is a schematic overall perspective view of the combined power system 400 according to the present embodiment.

Hereinafter, the respective terms "left", "right", "lower", and "upper" refer specifically to the left, right, lower and upper directions shown in FIG. 3 to FIG. 6, FIG. 13, and FIG. 14. However, these directions are provided for the sake of convenience in order to simplify the description and to facilitate understanding. In particular, the directions described in the specification are not limited to the directions when the combined power system is actually used.

The combined power system 400 is equipped with the rotating electric machine system 10, and a gas turbine engine 200. An axis extending along a longitudinal direction (axial direction) through a diametrical center of the rotating electric machine system 10 coincides with an axis extending along a longitudinal direction (axial direction) through a diametrical center of the gas turbine engine 200. Stated otherwise, the rotating electric machine system 10 and the gas turbine engine 200 are arranged on the same axis.

Hereinafter, the left end in the axial direction of each of the rotating electric machine system 10 and the gas turbine engine 200 may be referred to as a first end. Similarly, the right end in the axial direction of each of the rotating electric machine system 10 and the gas turbine engine 200 may be referred to as a second end. More specifically, in the rotating electric machine system 10, the left end part which is separated away from the gas turbine engine 200 is the first end. In the rotating electric machine system 10, the right end part which is in proximity to the gas turbine engine 200 is the second end. Further, in the gas turbine engine 200, the left end part which is in proximity to the rotating electric machine system 10 is the first end. In the gas turbine engine 200, the right end part which is separated away from the rotating electric machine system 10 is the second end. According to these definitions, in the illustrated example, the gas turbine engine 200 is disposed at the second end of the rotating electric machine system 10. The rotating electric machine system 10 is disposed at the first end of the gas turbine engine 200.

The combined power system 400 is used, for example, as a power source for providing propulsion in a flying object, a ship, an automobile, or the like. Suitable specific examples of the flying object include drones and multi-copters. The combined power system 400, when mounted on a flying object, is used as a power drive source for rotationally urging, for example, a prop, a ducted fan, or the like. The combined power system 400, when mounted on a ship, is used as a screw rotational force generating device. The combined power system 400, when mounted on an automobile, is used as a power drive source for rotating a motor.

The combined power system 400 can also be used as an auxiliary power source in an aircraft, a ship, a building, or the like. Apart therefrom, it is also possible to utilize the combined power system 400 as gas turbine power generation equipment.

As will be discussed later, the gas turbine engine 200 is an internal combustion engine. Further, the gas turbine engine 200 serves as a gas supplying device that supplies compressed air (a gas).

Figure 2:
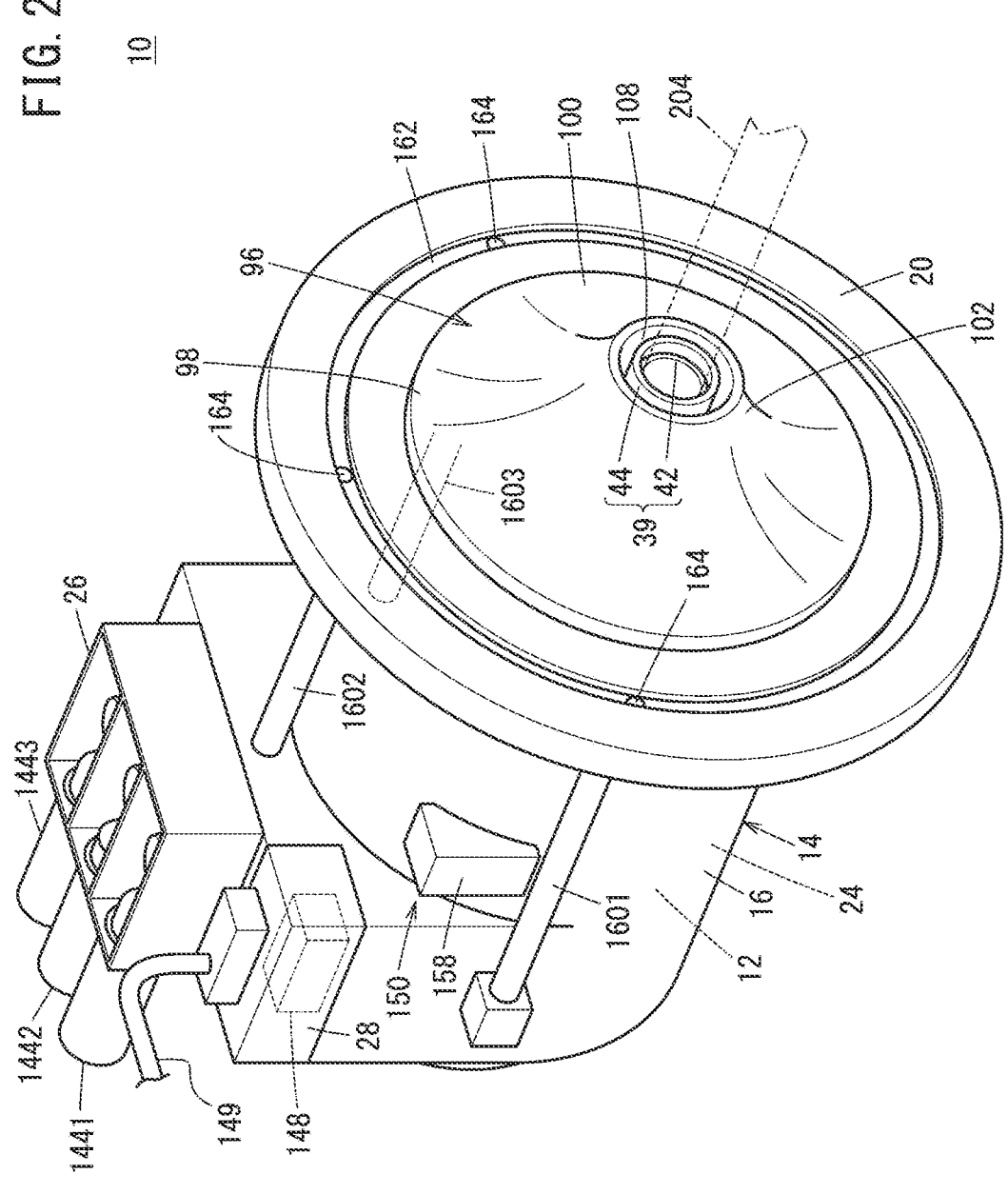
FIG. 2 is an external perspective view of the rotating electric machine system constituting part of the combined power system shown in FIG. 1.
Figure 3:
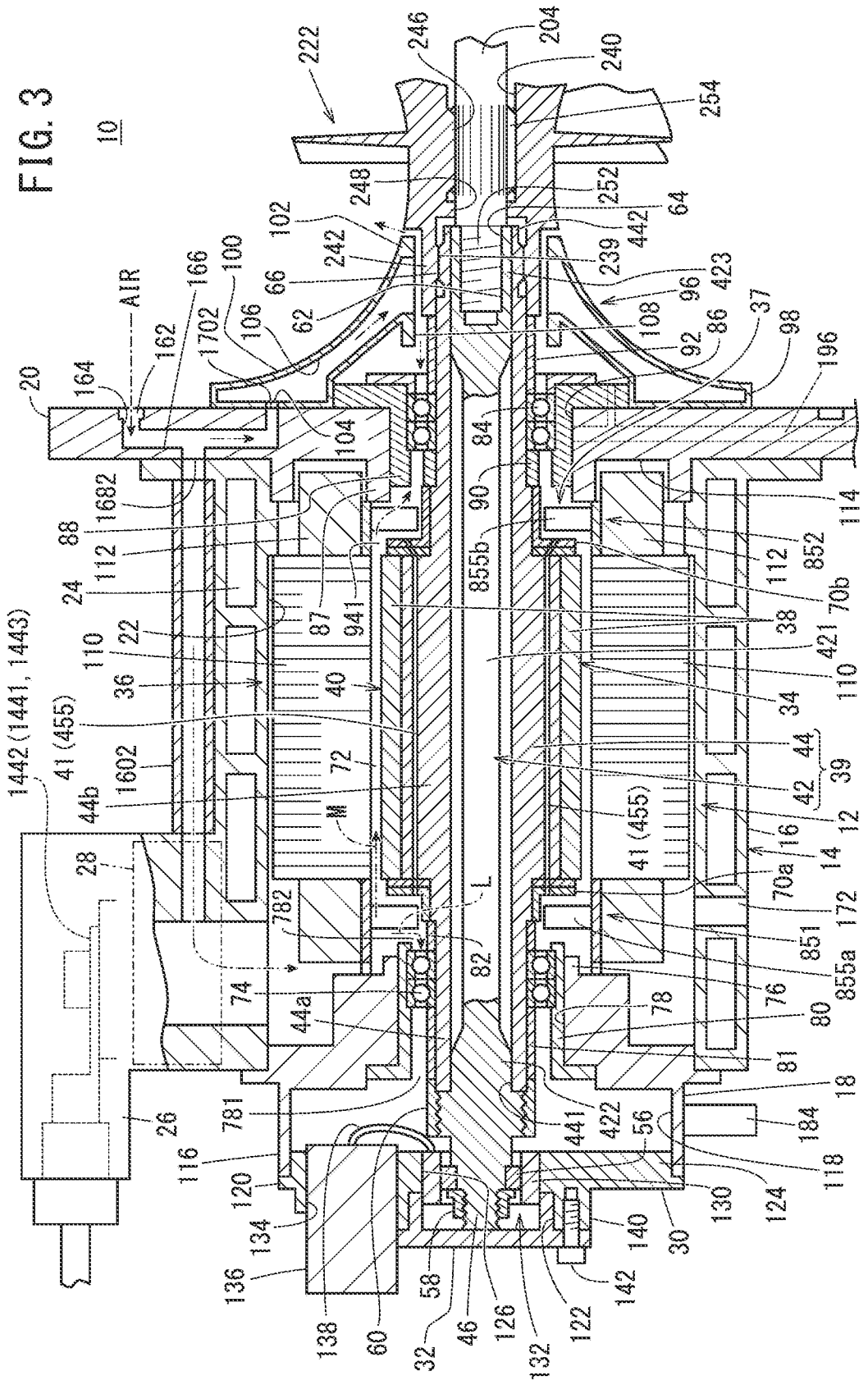
FIG. 3 is a schematic side cross-sectional view of the rotating electric machine system shown in FIG. 2.

First, a description will be given concerning the rotating electric machine system 10. FIG. 2 is a schematic overall perspective view of the rotating electric machine system 10. FIG. 3 is a schematic side cross-sectional view of the rotating electric machine system 10. The rotating electric machine system 10 is equipped with a rotating electric machine 12 (for example, a generator) and a rotating electric machine housing 14 in which the rotating electric machine 12 is accommodated.

The rotating electric machine housing 14 includes a main housing 16, a first sub-housing 18, and a second sub-housing 20. The main housing 16 exhibits a generally cylindrical shape, and both a first end and a second end thereof are open ends. The first sub-housing 18 is connected to the first end (the left open end) of the main housing 16. The second sub-housing 20 is connected to the second end (the right open end) of the main housing 16. In accordance with the foregoing, the first end and the second end of the main housing 16 are closed.

The main housing 16 has a thick side wall that extends in a left-right direction. An accommodation chamber 22 is formed in the interior of the side wall of the main housing 16. A major portion of the rotating electric machine 12 is accommodated in the accommodation chamber 22.

A spiral cooling jacket 24 is formed in the interior of the side wall of the main housing 16. A cooling medium flows through the cooling jacket 24. As a specific example of the cooling medium, there may be cited cooling water. In this case, the cooling jacket 24 is a water jacket.

A first casing 26 and a second casing 28 are provided in the vicinity of an edge part of a first end on an outer surface (an outer side wall) of a side wall of the main housing 16. The first casing 26 and the second casing 28 constitute one portion of the main housing 16. More specifically, the first casing 26 and the second casing 28 are disposed integrally with the main housing 16. As will be discussed later, the first casing 26 is a terminal casing. The second casing 28 is a measurement instrument casing.

A retaining member that retains a rotational parameter detector is connected to the first sub-housing 18. According to the present embodiment, as the rotational parameter detector, a resolver 132 is exemplified. Accordingly, hereinafter, the retaining member of the detector will be referred to as a "resolver holder 30". As will be discussed later, a cap cover 32 is connected via screws to the resolver holder 30.

The rotating electric machine 12 includes a rotor 34, a stator 36 that surrounds an outer circumference of the rotor 34, and a rectifying structure 37.

The rotor 34 includes magnets 38, a rotating shaft 39, an enlarged diameter portion 40, cooling passages 41, and first and second magnet holders 70a and 70b. The rotating shaft 39 includes an inner shaft 42, and a hollow tubular shaped outer shaft 44. Both ends of a main body portion 44a of the outer shaft 44 are open ends. More specifically, the main body portion 44a has a left open end 441 (refer to FIG. 5) and a right open end 442 (refer to FIG. 6). The left open end 441 is arranged at a left end, which is one end in the axial direction of the main body portion 44a. The right open end 442 is arranged at a right end, which is another end in the axial direction of the main body portion 44a.

The inner shaft 42 is removably inserted into the interior of the outer shaft 44. The inner shaft 42 is longer in comparison with the outer shaft 44. The inner shaft 42 includes a cylindrical columnar part 421, a left end part 422 (refer to FIG. 5), and a right end part 423 (refer to FIG. 6). The left end part 422 connects to the left side of the cylindrical columnar part 421. Accordingly, the left end part 422 is an end part (a first end) of the inner shaft 42 that is separated away from the gas turbine engine 200. The right end part 423 connects to the right side of the cylindrical columnar part 421. Accordingly, the right end part 423 is an end part (a second end) of the inner shaft 42 that is in proximity to the gas turbine engine 200. The diameter of the cylindrical columnar part 421 is smaller than the diameters of the left end part 422 and the right end part 423. Further, the diameter of the right end part 423 is smaller than the diameter of the left end part 422.

One portion of the left end part 422 is exposed from the left open end 441 of the outer shaft 44. The portion exposed from the left open end 441 is a projecting distal end 46, which will be described later. Moreover, in the illustrated example, the right end part 423 of the inner shaft 42 and the right open end 442 of the outer shaft 44 are flush with each other. However, the right end part 423 may be positioned in a slightly offset manner from the right open end 442 toward the second end.

As shown in FIG. 5, on the left end part 422 of the inner shaft 42, a first externally threaded portion 48, a flange portion 50, a stopper portion 52, and a second externally threaded portion 54 are arranged sequentially in this order toward the right. The outer diameters of the first externally threaded portion 48, the flange portion 50, the stopper portion 52, and the second externally threaded portion 54 become larger in this order. The outer diameter of the second externally threaded portion 54 is larger in comparison with the inner diameter of the outer shaft 44. Therefore, the right end of the second externally threaded portion 54 is held back by the edge of the left open end 441 of the outer shaft 44. Accordingly, a portion of the inner shaft 42 on the left relative to the second externally threaded portion 54 is not inserted into the outer shaft 44.

A resolver rotor 56 is attached to the flange portion 50. A small cap nut 58 is screw-engaged with the first externally threaded portion 48. A right end of the resolver rotor 56 is held back by the stopper portion 52. A left end of the resolver rotor 56 is pressed by the small cap nut 58. In accordance with the foregoing, the resolver rotor 56 is positioned and fixed to the flange portion 50.

A large cap nut 60 is screwed-engaged with the second externally threaded portion 54. A right end of the large cap nut 60 covers an outer circumferential wall of the left open end 441 of the outer shaft 44. In accordance with this feature, the left end part 422 of the inner shaft 42 is restrained by the left open end 441 of the outer shaft 44. Both the first externally threaded portion 48 and the second externally threaded portion 54 are so-called reverse threads. Accordingly, when screw-engaged, the small cap nut 58 and the large cap nut 60 are rotated counterclockwise. After being screw-engaged, it is preferable to partially deform the screw threads of the small cap nut 58 and the large cap nut 60. In accordance with this feature, the small cap nut 58 and the large cap nut 60 are prevented from becoming loosened.

Figure 6:
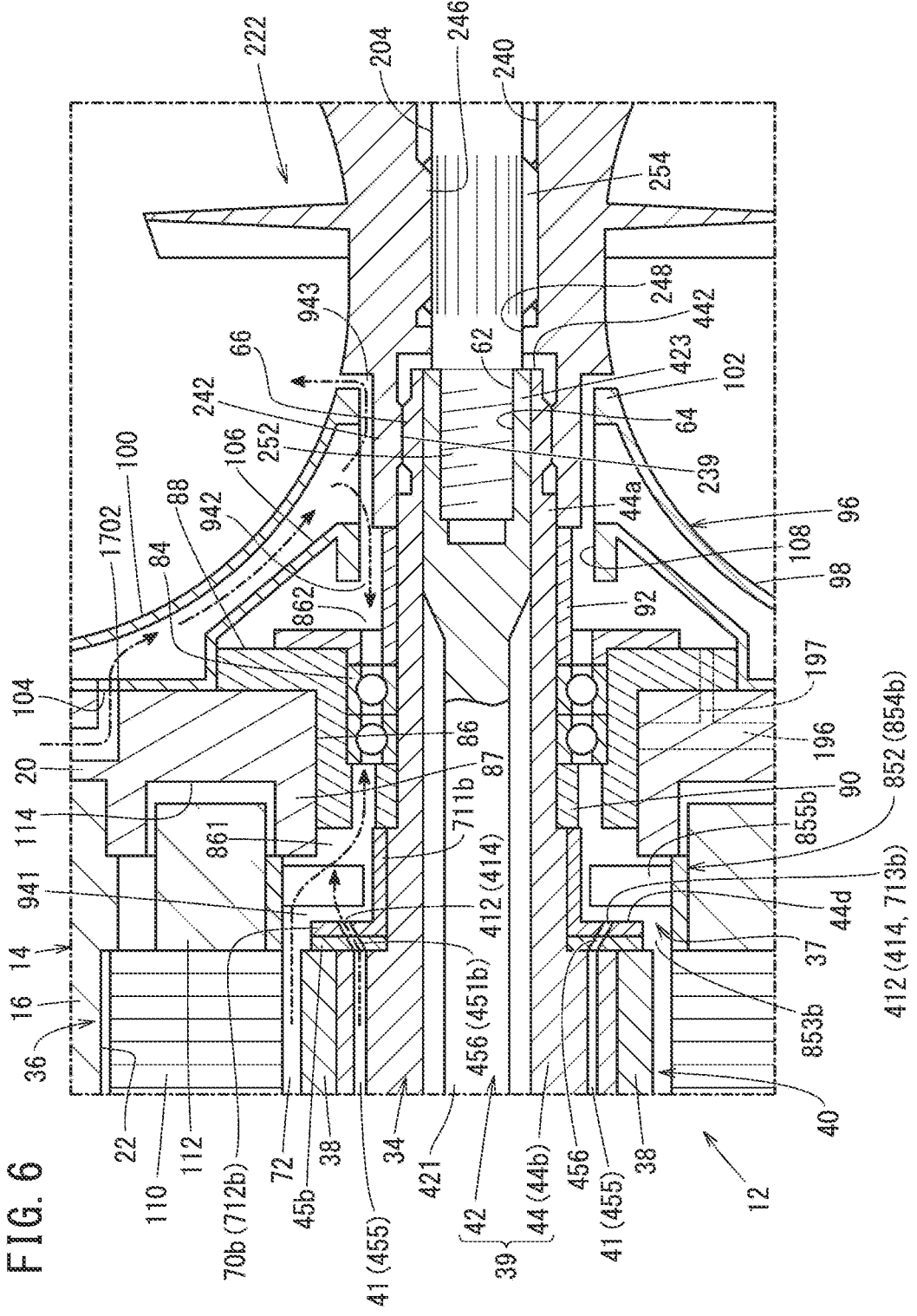
FIG. 6 is an enlarged view of principal components showing the vicinity of an outlet side rectifying member of the rotating electric machine system shown in FIG. 3.

As shown in FIG. 6, a connecting hole 62 is formed in the right end part 423 which is the second end of the inner shaft 42. The connecting hole 62 extends toward the left end part 422 which is the first end. A female threaded portion 64 is engraved on an inner circumferential wall of the connecting hole 62. The left end of an output shaft 204 is inserted into the connecting hole 62. The left end of the output shaft 204 is coupled to the inner shaft 42 by being screw-engaged with the female threaded portion 64. A compressor wheel 222 and a turbine wheel 224 (refer to FIG. 13) are retained on the output shaft 204.

As shown in FIG. 3, the outer shaft 44 includes the main body portion 44a, an intermediate portion 44b, and the cooling passages 41. The main body portion 44a extends in the axial direction of the outer shaft 44. The left end and the right end of the main body portion 44a are rotatably supported, respectively, by the first and second sub-housings 18 and 20. Further, a first inner spline 66 is formed on the outer circumferential wall of the right open end 442 of the main body portion 44a. The first inner spline 66 extends along the axial direction (left-right direction) of the rotating electric machine system 10.

The enlarged diameter portion 40 is constituted from the intermediate portion 44b of the outer shaft 44, portions of the first and second magnet holders 70a and 70b, the first and second retaining plates 45a and 45b, and the magnets 38. The intermediate portion 44b is arranged in the center in the axial direction of the outer shaft 44. In the axial direction of the rotor 34, the intermediate portion 44b is arranged at an intermediate section between the left end and the right end of the main body portion 44a. The intermediate portion 44b is enlarged in diameter outwardly in a radial direction from the main body portion 44a. The outer diameter of the outer shaft 44 is the largest at the intermediate portion 44b.

The plurality of individual magnets 38 are retained on the outer circumference of the intermediate portion 44b. In the rotor 34, the magnets 38 are arranged outwardly in the radial direction. A left end of the magnets 38 is retained by the first magnet holder 70a. Right ends of the magnets 38 are retained by the second magnet holder 70b. The first magnet holder 70a includes a cylindrical portion 711a and a pressing portion 712a. The second magnet holder 70b includes a cylindrical portion 711b and a pressing portion 712b. Each of the cylindrical portions 711a and 711b is installed on the outer circumferential surface of the main body portion 44a of the outer shaft 44. Each of the pressing portions 712a and 712b projects out, respectively, outwardly in the direction from the ends of the cylindrical portions 711a and 711b. Each of the pressing portions 712a and 712b is of an annular shape that is disposed perpendicularly with respect to the cylindrical portions 711a and 711b.

As shown in FIG. 4, the first magnet holder 70a faces toward the left ends of the magnets 38. The pressing portion 712a of the first magnet holder 70a retains the left ends of the magnets 38 via the first retaining plate 45a. The first retaining plate 45a is arranged between the pressing portion 712a and the intermediate portion 44b.

The pressing portion 712a includes a first upstream side hole portion 713a. The first upstream side hole portion 713a constitutes one portion of the cooling passages 41. The first upstream side hole portion 713a extends in the axial direction of the rotating shaft 39 and penetrates through the pressing portion 712a. The first upstream side hole portion 713a communicates with a second upstream side hole portion 451a of the first retaining plate 45a. The second upstream side hole portion 451a extends in the axial direction of the rotating shaft 39 and penetrates through the first retaining plate 45a. The second upstream side hole portion 451a constitutes one portion of the cooling passages 41. The first upstream side hole portion 713a and the second upstream side hole portion 451a are arranged on a straight line along the axial direction of the rotating shaft 39.

The second magnet holder 70b faces toward the right ends of the magnets 38. The pressing portion 712b of the second magnet holder 70b retains the right ends of the magnets 38 via the second retaining plate 45b. The second retaining plate 45b is arranged between the pressing portion 712b and the intermediate portion 44b.

The pressing portion 712b includes a first downstream side hole portion 713b. The first downstream side hole portion 713b constitutes one portion of the cooling passages 41. The first downstream side hole portion 713b extends in the axial direction of the rotating shaft 39 and penetrates through the pressing portion 712b. The first downstream side hole portion 713b communicates with a second downstream side hole portion 451b of the second retaining plate 45b. The second downstream side hole portion 451b extends in the axial direction of the rotating shaft 39 and penetrates through the second retaining plate 45b. The second downstream side hole portion 451b constitutes one portion of the cooling passages 41. The first downstream side hole portion 713b and the second downstream side hole portion 451b are arranged on a straight line along the axial direction of the rotating shaft 39.

The cylindrical portions 711a and 711b of the first and second magnet holders 70a and 70b are retained on the outer circumferential surface of the main body portion 44a. The first and second magnet holders 70a and 70b and the magnets 38 rotate together with the rotating shaft 39 as one portion of the rotor 34. In the magnets 38 that are adjacent to each other, polarities thereof which are different from each other face outward. As the rotating shaft 39 undergoes rotation, the magnets 38 move along a predetermined circumference about the center of rotation of the rotating shaft 39. In the rotor 34, boundaries between the intermediate portion 44b including the magnets 38, the first and second magnet holders 70a and 70b, the first and second retaining plates 45a and 45b, and the main body portion 44a are formed in a stepped shape.

The enlarged diameter portion 40 includes a first wall surface 44c that faces in the leftward direction of the rotor 34. The first wall surface 44c is arranged on the pressing portion 712a of the first magnet holder 70a that makes up the left end of the enlarged diameter portion 40. The first wall surface 44c is an annular shaped end surface. The enlarged diameter portion 40 includes a second wall surface 44d that faces in the rightward direction of the rotor 34. The second wall surface 44d is arranged on the pressing portion 712b of the second magnet holder 70b that makes up the right end of the enlarged diameter portion 40. The second wall surface 44d is an annular shaped end surface.

A gas flow passage 72 is included outwardly in the radial direction of the magnets 38 of the rotor 34. The gas flow passage 72 is a clearance between the magnets 38 and the stator 36 (electromagnetic coils 110) which are arranged outwardly in the radial direction of the magnets 38. The gas flow passage 72 is of an annular shape, and extends along the direction of the axis of rotation of the rotating shaft 39. The gas flow passage 72 is positioned between the left ends and the right ends of the magnets 38. The compressed air, which is a cooling gas, flows through the gas flow passage 72. The compressed air is supplied from the gas turbine engine 200, which will be described later.

The cooling passages 41 are flow passages through which the compressed air, which is a cooling gas, flows. The compressed air is supplied from the gas turbine engine 200, which will be described later. The gas turbine engine 200 serves as a gas supplying mechanism which is capable of supplying the compressed air to the cooling passages 41 and the gas flow passage 72. The gas turbine engine 200 is provided separately from the rotor 34.

The cooling passages 41 are arranged in the interior of the intermediate portion 44b of the rotating shaft 39, and the first and second magnet holders 70a and 70b. In a cross section perpendicular to the axis of the rotating shaft 39 shown in FIG. 7 and FIG. 8, the cooling passages 41 are of a circular shape. The cooling passages 41 extend in the direction of the axis of rotation of the outer shaft 44. The cooling passages 41 are rotor internal cooling passages arranged in the interior of the rotor 34.

Figure 7:
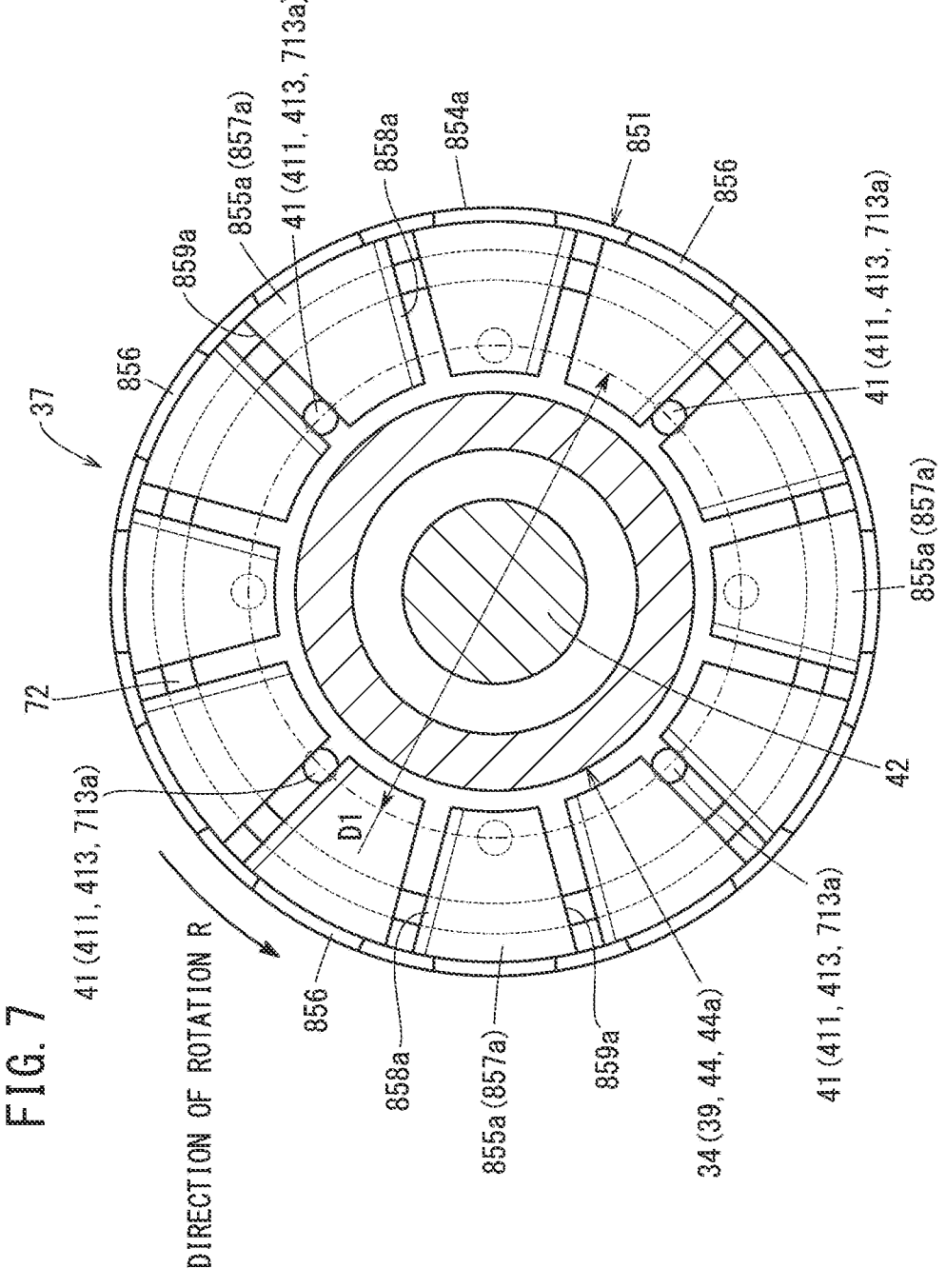
FIG. 7 is a front view of the inlet side rectifying member as viewed from an axial direction.
Figure 8:
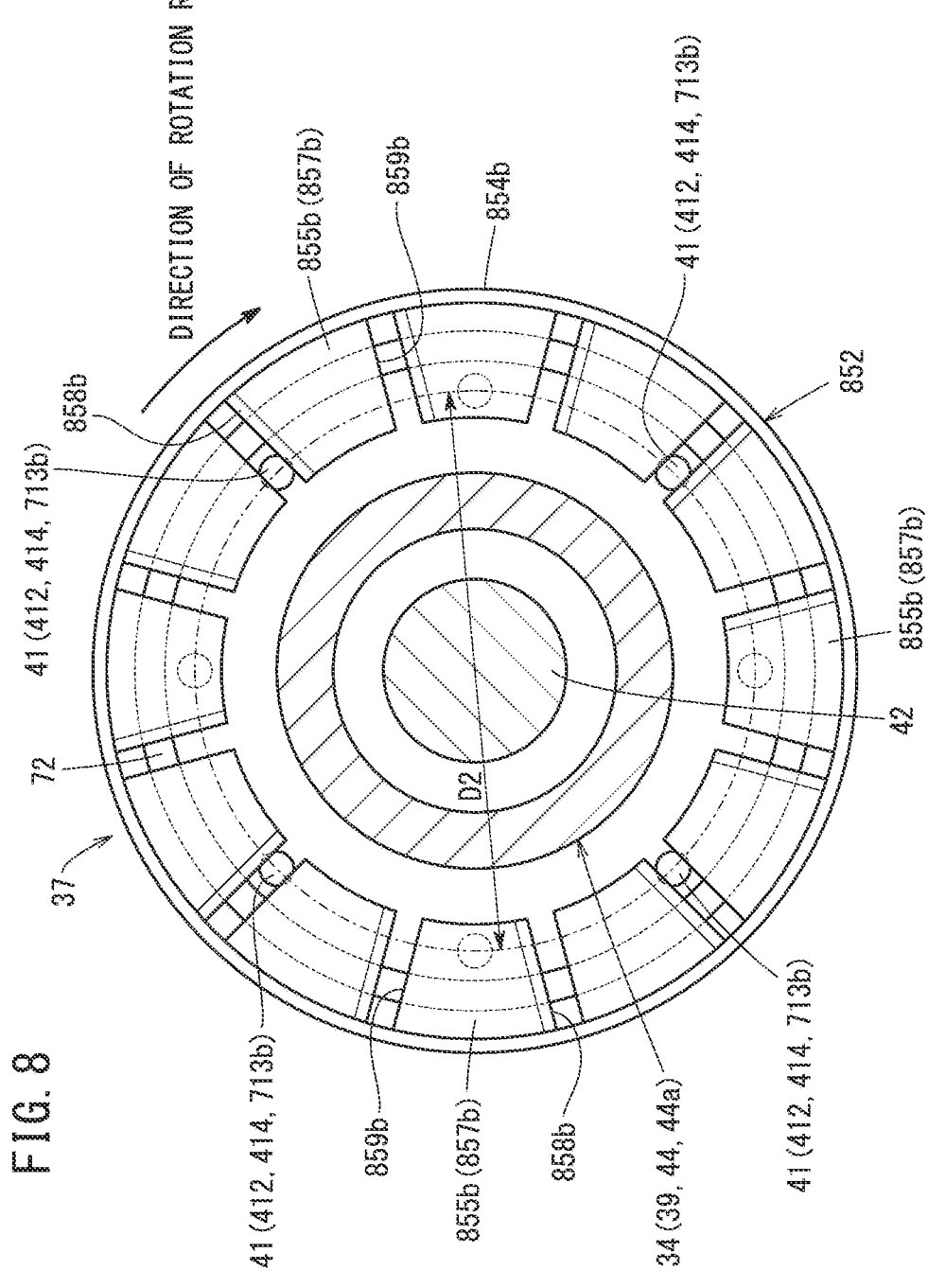
FIG. 8 is a front view of the outlet side rectifying member as viewed from an axial direction.

As shown in FIG. 7 and FIG. 8, a plurality of the cooling passages 41 are provided. The plurality of the cooling passages 41 are arranged to be offset in the radial direction from the axial center of rotation of the rotor 34 (the outer shaft 44). The plurality of the cooling passages 41 are spaced from each other in the circumferential direction at equal intervals about the axis of rotation of the rotor 34. The plurality of the cooling passages 41 are arranged on the same circle of the outer shaft 44 about the axis of rotation of the rotating shaft 39. The number of the cooling passages 41 is preferably greater than or equal to four, for example. Hereinafter, a case will be described in which the rotor 34 is equipped with eight cooling passages 41.

As shown in FIG. 4, the cooling passages 41 open on the first and second wall surfaces 44c and 44d of the enlarged diameter portion 40 in the rotor 34. The cooling passages 41 include first and second opening portions 411 and 412 (refer to FIG. 5 and FIG. 6).

As shown in FIG. 5, the first opening portions 411 are arranged at upstream ends of the cooling passages 41. More specifically, the first opening portions 411 are inlets 413 through which the compressed air is introduced. The first opening portions 411 are arranged on the first wall surface 44c of the enlarged diameter portion 40. The first opening portions 411, which are on the upstream ends of the cooling passages 41, open on the outer surface of the rotor 34 (the first magnet holder 70a). The first opening portions 411 are arranged in the first upstream side hole portion 713a of the first magnet holder 70a.

As shown in FIG. 6, the second opening portions 412 are arranged at downstream ends of the cooling passages 41. More specifically, the second opening portions 412 are outlets 414 through which the compressed air that has flowed through the cooling passages 41 flows out. The second opening portions 412 are arranged on the second wall surface 44d of the enlarged diameter portion 40. The second opening portions 412, which are on the downstream ends of the cooling passages 41, open on the outer surface of the rotor 34 (the second magnet holder 70b). The second opening portions 412 are arranged in the first downstream side hole portion 713b of the second magnet holder 70b.

As shown in FIG. 5 and FIG. 6, the first and second opening portions 411 and 412 are arranged to be offset in the radial direction from the axial center of rotation of the rotor 34. In the radial direction of the rotor 34, the second opening portions 412 may be positioned between the inner circumference and the outer circumference of the magnets 38.

As shown in FIG. 4, each of the cooling passages 41 includes a parallel portion 455 and an inclined portion 456. The parallel portions 455 extend along the direction of the axis of rotation of the outer shaft 44. The parallel portions 455 are arranged in parallel with the axis of rotation of the outer shaft 44. The parallel portions 455 are arranged in the intermediate portion 44b. The parallel portions 455 are arranged inwardly of the magnets 38 in the radial direction. As shown in FIG. 5, the upstream ends of the parallel portions 455 are the first opening portions 411 (the inlets 413). The upstream ends of the parallel portions 455 are constituted by the first upstream side hole portion 713a of the first magnet holder 70a and the second upstream side hole portion 451a of the first retaining plate 45a. Moreover, the cooling passages 41 may be formed in a spiral shape from the upstream ends to the downstream ends of the cooling passages 41.

As shown in FIG. 4, the upstream ends of the inclined portions 456 are connected to the downstream ends of the parallel portions 455. As shown in FIG. 6, the inclined portions 456 are inclined outwardly in the radial direction with respect to the parallel portions 455, toward the second opening portions 412 (the outlets 414) from the downstream ends (the right ends) of the parallel portions 455. The downstream ends of the inclined portions 456 are the second opening portions 412 (the outlets 414). The inclined portions 456 are constituted by the first downstream side hole portion 713*b* of the second magnet holder 70*b* and the second downstream side hole portion 451*b* of the second retaining plate 45*b*.

Moreover, it should be noted that the position of the inclined portions 456 is not limited to being arranged at the downstream ends of the parallel portions 455. It is sufficient if the inclined portions 456 are arranged in a portion in the direction in which the cooling passages 41 extend. A plurality of the inclined portions 456 may be arranged in each of the cooling passages 41. The cooling passages 41 need not necessarily be equipped with the parallel portions 455, and may be constituted entirely by the inclined portions 456 in the direction in which the cooling passages 41 extend from the upstream end to the downstream end.

As shown in FIG. 5, a left end of the main body portion 44*a* of the rotating shaft 39 is rotatably supported in the first sub-housing 18 via a first bearing 74. The first bearing 74 is inserted between the outer shaft 44 and the first sub-housing 18. Specifically, the first sub-housing 18 includes a cylindrical columnar shaped projecting portion 76 that is projected out toward the main housing 16. A first insertion hole 78 is formed in the cylindrical columnar shaped projecting portion 76. A first bearing holder 80 by which the first bearing 74 is retained is inserted into the first insertion hole 78. Accordingly, the first bearing 74 is arranged in the first insertion hole 78.

The first insertion hole 78 extends along the left-right direction. The left end of the first insertion hole 78 is separated farther away from the output shaft 204 than the right end of the first insertion hole 78. Hereinafter, the left end of the first insertion hole 78 may also be referred to as a "first distal end 781". On the other hand, the right end of the first insertion hole 78 is in closer to the output shaft 204 than the left end (the first distal end 781) of the first insertion hole 78 is. Hereinafter, the right end of the first insertion hole 78 may also be referred to as a "first proximal end 782".

On the left end of the main body portion 44*a* of the outer shaft 44, a first outer stopper 81 is positioned at the first distal end 781, and a first inner stopper 82 is positioned at the first proximal end 782. The first bearing 74 is sandwiched between the first outer stopper 81 and the first inner stopper 82. Due to being sandwiched by the first outer stopper 81 and the first inner stopper 82, the first bearing 74 is positioned and fixed in place. A clearance is formed between the first outer stopper 81 and the columnar shaped projecting portion 76.

The distal end of the left end part of the rotating shaft 39 passes through the first insertion hole 78 after having passed through an inner hole of the first bearing 74. The distal end of the left end part of the rotating shaft 39 is further exposed on an outer side (a hollow concave portion 118) of the columnar shaped projecting portion 76. Hereinafter, the portion of the rotating shaft 39 that is projected out from the left end of the first bearing 74 is referred to as a "projecting distal end 46". Within the left end part 422 of the inner shaft 42, the first externally threaded portion 48, the flange portion 50, the stopper portion 52, and the second externally threaded portion 54 are included on the projecting distal end 46.

As shown in FIG. 6, a right end of the rotating shaft 39 is rotatably supported in the second sub-housing 20 via the second bearing 84. As shown in FIG. 6, the second bearing

84 is inserted between the outer shaft 44 and the second sub-housing 20 which exhibits a substantially disk shape.

As shown in FIG. 4, the rectifying structure 37 is accommodated in the interior of the main housing 16. The rectifying structure 37 is capable of rectifying the flow of the compressed air that flows through the main housing 16. The rectifying structure 37 includes an inlet side rectifying member 851 and an outlet side rectifying member 852.

As shown in FIG. 5, the inlet side rectifying member 851 serves to rectify the compressed air that flows into the gas flow passage 72 and the cooling passages 41. The inlet side rectifying member 851 is arranged in a first space 853*a*. The first space 853*a* is a space surrounded by the first magnet holder 70*a*, the first bearing 74, the first sub-housing 18, and insulating substrates 112, which will be described later. The inlet side rectifying member 851 faces toward the inlets 413 (the first opening portions 411) of the cooling passages 41. The inlet side rectifying member 851 faces toward the inlet of the gas flow passage 72. More specifically, the inlet side rectifying member 851 faces toward the upstream end of the cooling passages 41 and the gas flow passage 72. The inlet side rectifying member 851 faces toward the columnar shaped projecting portion 76 of the first sub-housing 18. The inlet side rectifying member 851 is arranged between the magnets 38 and the first bearing 74. The inlet side rectifying member 851 is disposed on the inner side of the insulating substrates 112.

As shown in FIG. 7, the inlet side rectifying member 851 includes a cylindrically shaped first body 854*a*, and a plurality of inlet side fins 855*a*.

As shown in FIG. 5, the outer circumferential surface of the first body 854*a* is held in contact with the insulating substrates 112, which will be described later. The left end of the first body 854*a* is held in contact with an end surface of the columnar shaped projecting portion 76. The right end of the first body 854*a* is held in contact with the left ends of the electromagnetic coils 110, which will be described later. The first body 854*a* is arranged outwardly in the radial direction of the first magnet holder 70*a*. The first body 854*a* is arranged more outwardly in the radial direction than the gas flow passage 72.

Consequently, in the interior of the main housing 16, the inlet side rectifying member 851 is retained in the axial direction and the radial direction by the insulating substrates 112, the columnar shaped projecting portion 76, and the electromagnetic coils 110, which are non-rotating members.

The left end of the first body 854*a* includes a plurality of communication holes 856. The communication holes 856 penetrate through the first body 854*a* in the radial direction. The plurality of the communication holes 856 are separated from each other along the circumferential direction of the first body 854*a* (refer to FIG. 9). When the inlet side rectifying member 851 is arranged in the first space 853*a*, a clearance between the insulating substrates 112 and the first sub-housing 18 faces toward the communication holes 856 (refer to FIG. 5). Such a clearance communicates with the communication holes 856.

The plurality of the inlet side fins 855*a* serve to rectify the flow of the compressed air supplied to the first space 853*a* in the circumferential direction (the direction of rotation) of the rotor 34.

As shown in FIG. 7, the plurality of the inlet side fins 855*a* are arranged on the inner circumferential surface of the first body 854*a*. Each of the inlet side fins 855*a* is disposed at a position closer to the magnets 38 than the communication holes 856 are. Each of the inlet side fins 855*a* projects out inwardly in the radial direction from the inner circumferential surface of the first body 854*a*. The plurality of the inlet side fins 855*a* are arranged in a manner so as to surround the axial center of rotation of the rotor 34 (the main body portion 44*a*). The plurality of the inlet side fins 855*a* are spaced at equal intervals along the circumferential direction of the first body 854*a*. Each of the inlet side fins 855*a* faces toward the enlarged diameter portion 40 (the first wall surface 44*c*) of the rotor 34, and the pressing portion 712*a* of the first magnet holder 70*a* (refer to FIG. 5).

A first virtual circle D1 mutually connecting the centers of each of the first opening portions 411 of the cooling passages 41 and the plurality of the inlet side fins 855*a* face toward each other in the axial direction. The left end of the gas flow passage 72 and the plurality of the inlet side fins 855*a* face toward each other in the axial direction (refer to FIG. 5).

Figure 9:
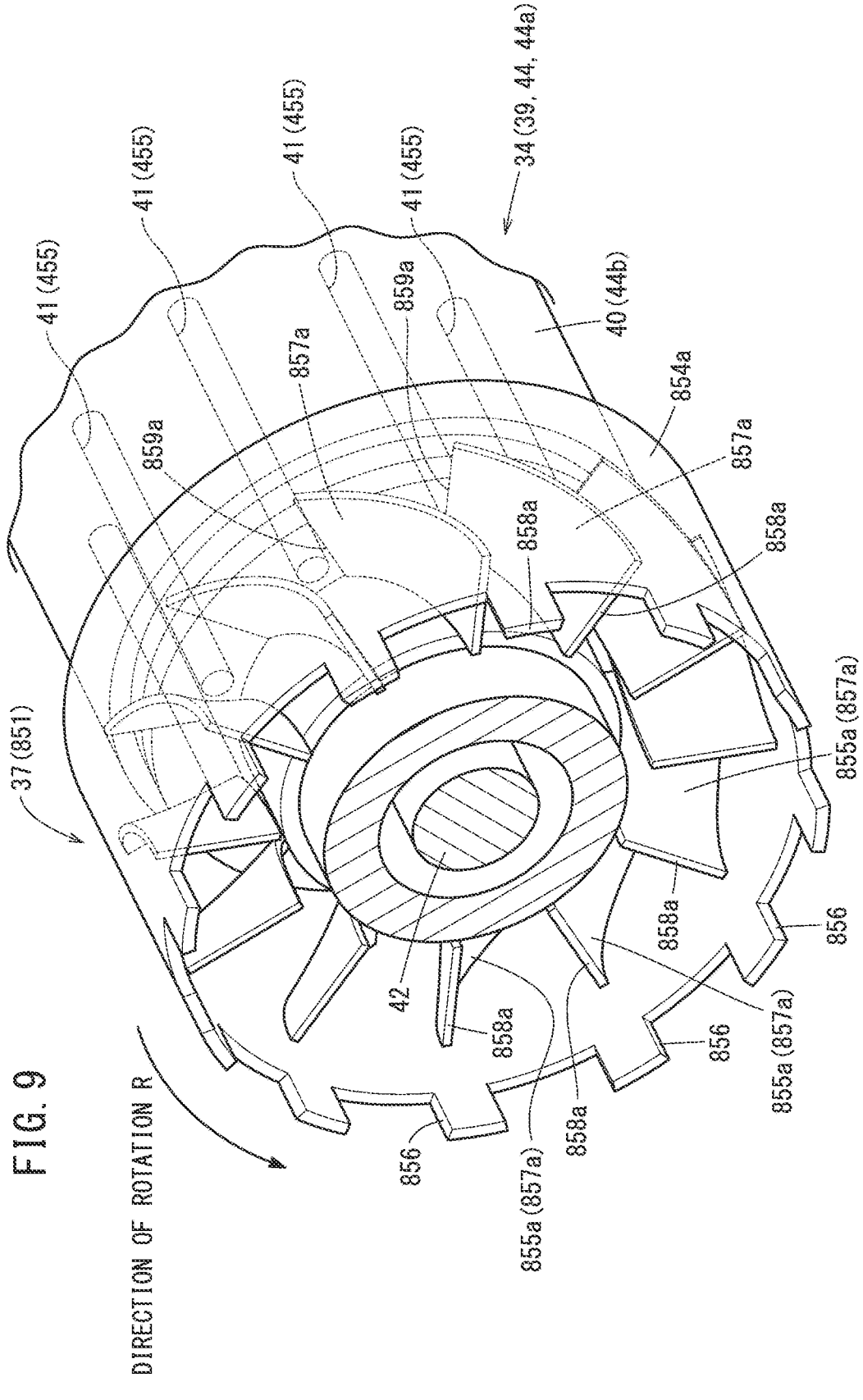
FIG. 9 is an external perspective view of the inlet side rectifying member.

As shown in FIG. 9, each of the inlet side fins 855*a* includes a direction changing portion 857*a*, a first fin end 858*a*, and a second fin end 859*a*. The direction changing portions 857*a* are curved from one end toward the other end in the axial direction of the first body 854*a*, in a manner so as to change the direction from the axial direction to the circumferential direction of the first body 854*a*. The first fin ends 858*a* are arranged at one end portion of the direction changing portions 857*a* in the axial direction of the first body 854*a*. The first fin ends 858*a* are upstream ends of the inlet side fins 855*a*. The first fin ends 858*a* face toward the axial direction of the first body 854*a*. The second fin ends 859*a* are arranged at the other end portion of the direction changing portions 857*a* in the axial direction of the first body 854*a*. The second fin ends 859*a* are downstream ends of the inlet side fins 855*a*. The second fin ends 859*a* extend in the circumferential direction of the first body 854*a* toward the first fin ends 858*a*.

When the inlet side rectifying member 851 shown in FIG. 5 is arranged in the first space 853*a*, the first fin ends 858*a* face toward the first bearing 74 and the columnar shaped projecting portion 76. The second fin ends 859*a* face toward the first wall surface 44*c* of the enlarged diameter portion 40. The second fin ends 859*a* face toward the gas flow passage 72 and the first opening portions 411 (the inlets 413) of the cooling passages 41.

The direction changing portions 857*a* are curved in the direction of rotation R of the rotating shaft 39 from the first fin ends 858*a* toward the second fin ends 859*a*. Hereinafter, a description will be given concerning a case in which the rotor 34 rotates in a counterclockwise direction (direction of rotation R) when viewed from the left end of the rotating shaft 39 shown in FIG. 7. When the compressed air is supplied to the inlet side rectifying member 851, the direction changing portions 857*a* of the plurality of the inlet side fins 855*a* change the direction of the compressed air toward the downstream side (rightward) in the direction of rotation R of the rotor 34.

As shown in FIG. 6, the outlet side rectifying member 852 serves to rectify the compressed air that flows out from the gas flow passage 72 and the cooling passages 41. The outlet side rectifying member 852 is arranged in a second space 853*b*. The second space 853*b* is a space surrounded by the second magnet holder 70*b*, the second sub-housing 20, and the insulating substrates 112, which will be described later. The outlet side rectifying member 852 faces toward the outlets 414 (the second opening portions 412) of the cooling passages 41 of the enlarged diameter portion 40. The outlet side rectifying member 852 faces toward the outlet of the gas flow passage 72. More specifically, the outlet side rectifying member 852 faces toward the downstream ends of the cooling passages 41 and the gas flow passage 72. The outlet side rectifying member 852 faces toward a cylindrically shaped portion 87 of the second sub-housing 20. The outlet side rectifying member 852 is arranged between the magnets 38 and the second bearing 84. The outlet side rectifying member 852 is disposed on the inner side of the insulating substrates 112.

As shown in FIG. 8, the outlet side rectifying member 852 includes a cylindrically shaped second body 854*b*, and a plurality of outlet side fins 855*b*. As shown in FIG. 6, the outer circumferential surface of the second body 854*b* is held in contact with the insulating substrates 112, which will be described later. The right end of the second body 854*b* is held in contact with an end surface of the cylindrically shaped portion 87 of the second sub-housing 20. The left end of the second body 854*b* is held in contact with the right ends of the electromagnetic coils 110, which will be described later. The second body 854*b* is arranged outwardly of the second magnet holder 70*b* in the radial direction. The second body 854*b* is arranged more outwardly in the radial direction than the gas flow passage 72.

Consequently, in the interior of the main housing 16, the outlet side rectifying member 852 is retained in the axial direction and the radial direction by the insulating substrates 112, the cylindrically shaped portion 87, and the electromagnetic coils 110, which are non-rotating members. The plurality of the outlet side fins 855*b* serve to rectify the flow of the compressed air that flows out from the cooling passages 41 and the gas flow passage 72 toward the axial direction of the rotor 34.

As shown in FIG. 8, the plurality of the outlet side fins 855*b* are arranged on the inner circumferential surface of the second body 854*b*. Each of the outlet side fins 855*b* projects out inwardly in the radial direction from the inner circumferential surface of the second body 854*b*. The plurality of the outlet side fins 855*b* are arranged in a manner so as to surround the axial center of rotation of the rotor 34. The plurality of the outlet side fins 855*b* are spaced at equal intervals along the circumferential direction of the second body 854*b*. Each of the outlet side fins 855*b* faces toward the enlarged diameter portion 40 (the second wall surface 44*d*) of the rotor 34, and the pressing portion 712*b* of the second magnet holder 70*b*.

A second virtual circle D2 mutually connecting the centers of each of the second opening portions 412 of the cooling passages 41 and the plurality of the outlet side fins 855*b* shown in FIG. 8 face toward each other in the axial direction. The right end of the gas flow passage 72 and the plurality of the outlet side fins 855*b* face toward each other in the axial direction (refer to FIG. 6).

Figure 10:
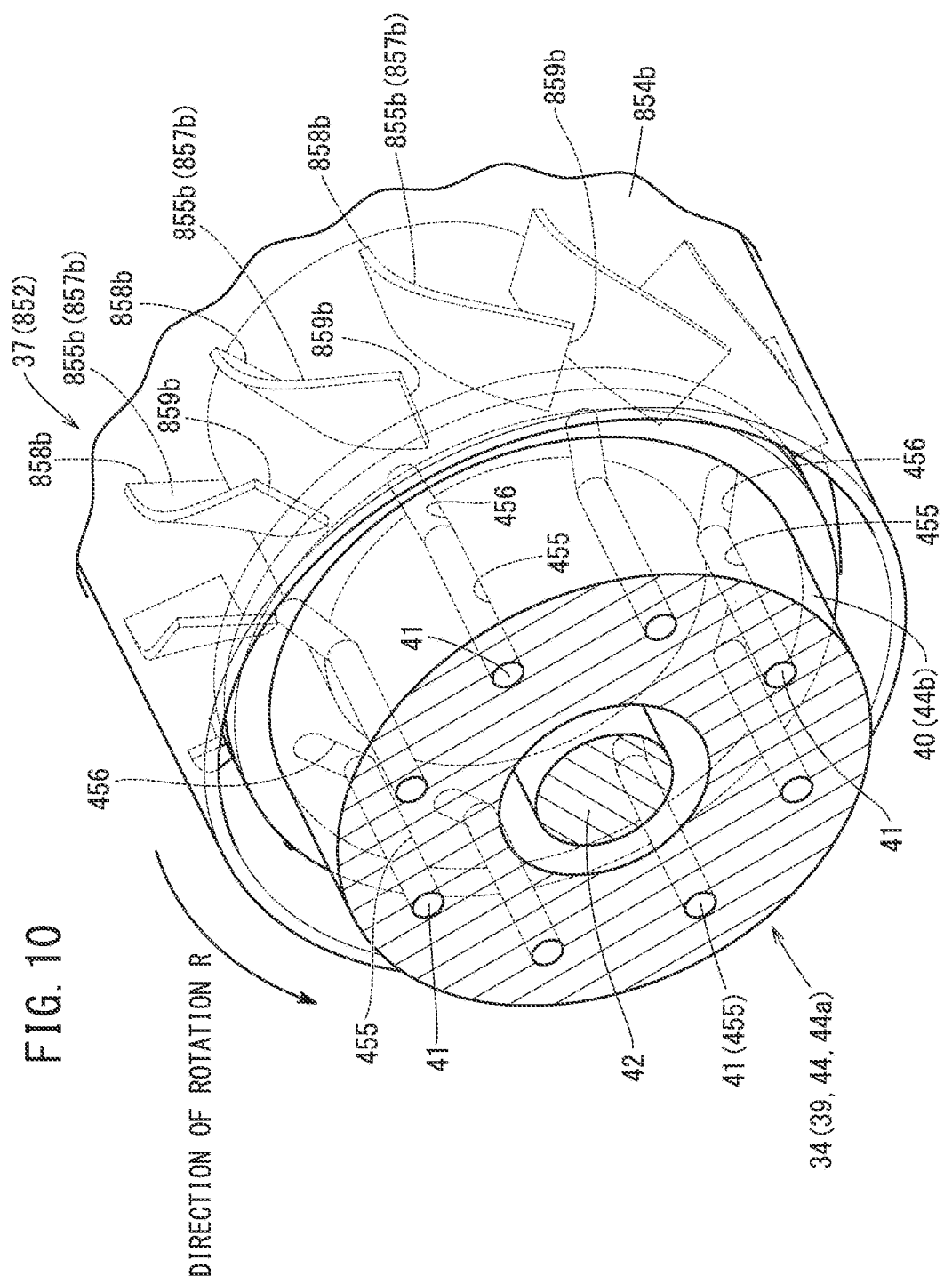
FIG. 10 is an external perspective view of the outlet side rectifying member.

As shown in FIG. 10, each of the outlet side fins 855*b* includes a direction changing portion 857*b*, a first fin end 858*b*, and a second fin end 859*b*. The direction changing portions 857*b* are curved from one end toward the other end in the axial direction of the second body 854*b*, in a manner so as to change the direction from the axial direction to the circumferential direction of the second body 854*b*. The first fin ends 858*b* are arranged at one end portion of the direction changing portions 857*b* in the axial direction of the second body 854*b*. The first fin ends 858*b* are upstream ends of the outlet side fins 855*b*. The first fin ends 858*b* face toward the axial direction of the second body 854*b*. The second fin ends 859*b* are arranged at another end portion of the direction changing portions 857*b* in the axial direction of the second body 854*b*. The second fin ends 859*b* are downstream ends of the outlet side fins 855*b*. The second fin ends 859*b* extend in the circumferential direction of the second body 854*b* toward the first fin ends 858*b*.

As shown in FIG. 6, when the outlet side rectifying member 852 is arranged in the second space 853b, the second fin ends 859b face toward the second magnet holder 70b and the second wall surface 44d of the enlarged diameter portion 40. The second fin ends 859b face toward the right end of the gas flow passage 72 and the second opening portions 412 (the outlets 414) of the cooling passages 41. The first fin ends 858b face toward the cylindrically shaped portion 87 of the second sub-housing 20.

The direction changing portions 857b are curved in the direction of rotation of the rotating shaft 39 from the second fin ends 859b toward the first fin ends 858a. When the compressed air flows out into the second space 853b from the cooling passages 41 and the gas flow passage 72, the direction changing portions 857b of the plurality of the outlet side fins 855b change the direction of the compressed air that is swirling in the direction of rotation of the rotor 34 toward the downstream side in the axial direction of the rotor 34.

Moreover, it should be noted that the arrangement of the inlet side rectifying member 851 and the outlet side rectifying member 852 in the first and second opening portions 411 and 412 of the cooling passages 41 is not limited. Only one of the inlet side rectifying member 851 and the outlet side rectifying member 852 may be arranged in a manner so as to face toward the cooling passages 41.

As shown in FIG. 3, the second sub-housing 20 is connected to the main housing 16 via non-illustrated bolts. The center of the second sub-housing 20 includes a cylindrically shaped portion 87. As shown in FIG. 6, a second insertion hole 86 is formed in such a cylindrically shaped portion 87. The second insertion hole 86 extends along the left-right direction. The left end of the second insertion hole 86 is separated farther away from the output shaft 204 than the right end of the second insertion hole 86. Hereinafter, the left end of the second insertion hole 86 may also be referred to as a "second distal end 861". On the other hand, the right end of the second insertion hole 86 is closer to the output shaft 204 than the left end (the second distal end 861) of the second insertion hole 86 is. Hereinafter, the right end of the second insertion hole 86 may also be referred to as a "second proximal end 862".

A second bearing holder 88 by which the second bearing 84 is retained is inserted into the second insertion hole 86. Accordingly, the second bearing 84 is arranged in the second insertion hole 86. The second bearing 84 is sandwiched between a second inner stopper 90 positioned at the second distal end 861, and a second outer stopper 92 positioned at the second proximal end 862. Based on being sandwiched in this manner, the second bearing 84 is positioned and fixed in place.

Further, at the second distal end 861, a clearance is formed between the second inner stopper 90 and the second bearing holder 88. This clearance defines a third sub-branching passage 941.

As shown in FIG. 2, a guide member 96 is connected to an end surface of the second sub-housing 20 facing toward the gas turbine engine 200. The guide member 96 includes a base portion 98, a reduced diameter portion 100, and a top portion 102. The base portion 98 which faces toward the second sub-housing 20 has a large diameter and a thin cylindrical plate shape. The top portion 102 which faces toward the gas turbine engine 200 has a small diameter and a relatively long cylindrical plate shape. In the reduced diameter portion 100 between the base portion 98 and the top portion 102, the diameter thereof gradually becomes smaller. Accordingly, the guide member 96 is a mountain (chevron) shaped body or a bottomless cup shaped body. The outer surface of the reduced diameter portion 100 is a smooth surface with a small surface roughness.

Introduction ports 104 are formed in an end surface of the base portion 98 facing toward the second sub-housing 20. Further, the reduced diameter portion 100 is hollow. More specifically, a relay chamber 106 is formed in the interior of the reduced diameter portion 100. The introduction ports 104 serve as inlets for the compressed air to enter into the relay chamber 106.

An insertion hole 108 is formed in the top portion 102 along the left-right direction. A diameter (an opening diameter) of the insertion hole 108 is larger than the outer diameter of a portion of the second outer stopper 92 that extends along the rotating shaft 39. Therefore, the portion of the second outer stopper 92 that has entered inside the insertion hole 108 and the outer circumferential wall are separated away from the inner wall of the insertion hole 108. Stated otherwise, a clearance is formed between the outer circumferential wall of the second outer stopper 92 and the inner wall of the insertion hole 108. This clearance defines a fourth sub-branching passage 942. The relay chamber 106 becomes wider as it comes closer to the insertion hole 108 and the fourth sub-branching passage 942.

Further, a diameter (an opening diameter) of the insertion hole 108 is larger than the outer diameter of the left end (a small diameter cylindrical portion 242) of the compressor wheel 222 which is relatively small in diameter. Therefore, the small diameter cylindrical portion 242 that has entered into the insertion hole 108 is also separated away from the inner wall of the insertion hole 108. Stated otherwise, a clearance is formed between the small diameter cylindrical portion 242 and the inner wall of the insertion hole 108. This clearance defines an outlet passage 943.

As shown in FIG. 3, the first insertion hole 78 and the third sub-branching passage 941 communicate with the accommodation chamber 22. Therefore, the first bearing 74 and the second bearing 84 are exposed in the accommodation chamber 22.

The stator 36 constitutes the rotating electric machine 12 together with the rotor 34. The stator 36 includes the electromagnetic coils 110 and the plurality of insulating substrates 112. The electromagnetic coils 110 include three types of coils, including a U-phase coil, a V-phase coil, and a W-phase coil, and are wound around the insulating substrates 112. In the case that the rotating electric machine 12 is a generator, the rotating electric machine 12 is a so-called three-phase power source. The plurality of insulating substrates 112 are arranged in an annular shape. Due to being arranged in this manner, an inner hole is formed in the stator 36. The inlet side rectifying member 851 is retained in the radial direction by the inner circumferential surfaces of the insulating substrates 112 that are arranged at the left end of the stator 36. The outlet side rectifying member 852 is retained in the radial direction by the inner circumferential surfaces of the insulating substrates 112 that are arranged at the right end of the stator 36.

The stator 36 is accommodated in the accommodation chamber 22. The second sub-housing 20 fulfills a role as a stator holder. More specifically, an annular shaped concave portion 114 is formed in the second sub-housing 20. The insulating substrates 112 included in the stator 36 are engaged with the annular shaped concave portion 114. Due to such engagement, the stator 36 is positioned and fixed in place. Furthermore, the columnar shaped projecting portion 76 enters into a left opening of the inner hole of the stator 36.

The inner wall of the accommodation chamber 22 and the electromagnetic coils 110 are slightly separated away from each other. Due to being separated in this manner, the main housing 16 and the electromagnetic coils 110 are electrically insulated.

As shown in FIG. 5, the first space 853a is provided between the outer circumferential wall of the columnar shaped projecting portion 76 and the insulating substrates 112. The gas flow passage 72 is provided between the outer walls of the magnets 38 and the inner walls of the electromagnetic coils 110. The compressed air flows through the first space 853a and the gas flow passage 72. In other words, the first space 853a and the gas flow passage 72 make up one portion of a compressed air flow passage.

The first sub-housing 18 includes an annular shaped convex portion 116 that projects out in an annular shape. The hollow concave portion 118 is formed on an inner side of the annular shaped convex portion 116. The projecting distal end 46, which is one portion of the left end part 422 of the inner shaft 42, enters into the hollow concave portion 118.

The resolver holder 30 is provided on the annular shaped convex portion 116. The resolver holder 30 has a flange shaped stopper 120 that is projected out toward an outer side in the radial direction. The flange shaped stopper 120 is larger in diameter than an inner diameter of the annular shaped convex portion 116. Accordingly, the flange shaped stopper 120 abuts against the annular shaped convex portion 116. Due to abutting in this manner, the resolver holder 30 is positioned. In this state, the resolver holder 30 is connected to the first sub-housing 18, for example, via mounting bolts (not shown).

A small cylindrical portion 122 is provided in the resolver holder 30 on a left side of the flange shaped stopper 120. Further, a large cylindrical portion 124 is provided on a right side of the flange shaped stopper 120. The large cylindrical portion 124 is larger in diameter than the small cylindrical portion 122. A retaining hole 126 is formed in the resolver holder 30. A major portion of a resolver stator 130 is fitted into the retaining hole 126. Due to being fitted therein in this manner, the resolver stator 130 is retained by the resolver holder 30.

At a time when the large cylindrical portion 124 enters into the hollow concave portion 118 and the flange shaped stopper 120 comes into abutment against the annular shaped convex portion 116, the resolver rotor 56 is positioned in the inner hole of the resolver stator 130. The resolver 132 is constituted by the resolver stator 130 and the resolver rotor 56. The resolver 132 serves as the rotational parameter detector. According to the present embodiment, the resolver 132 detects an angle of rotation of the inner shaft 42. Moreover, as noted previously, the resolver rotor 56 is retained by the flange portion 50 on the left end part 422 of the inner shaft 42.

An engagement hole 134 is formed in the flange shaped stopper 120. A transmission connector 136 is engaged with the engagement hole 134. The resolver stator 130 and the transmission connector 136 are electrically connected via a signal line 138. Moreover, a reception connector of a receiver (not shown) is inserted into the transmission connector 136. The resolver 132 and the receiver are electrically connected via the transmission connector 136 and the reception connector. The receiver receives signals emitted by the resolver 132.

A plurality of tab portions 140 (which are omitted from illustration in FIG. 1) are provided on the small cylindrical portion 122. An individual one of the tab portions 140 is shown in FIG. 3. Furthermore, the small cylindrical portion 122 is covered by the cap cover 32. The cap cover 32 closes a left opening of the small cylindrical portion 122, and in addition, shields the left end part 422 of the inner shaft 42. Moreover, it should be noted that the cap cover 32 is connected to the tab portions 140 via connecting bolts 142.

Figure 11:
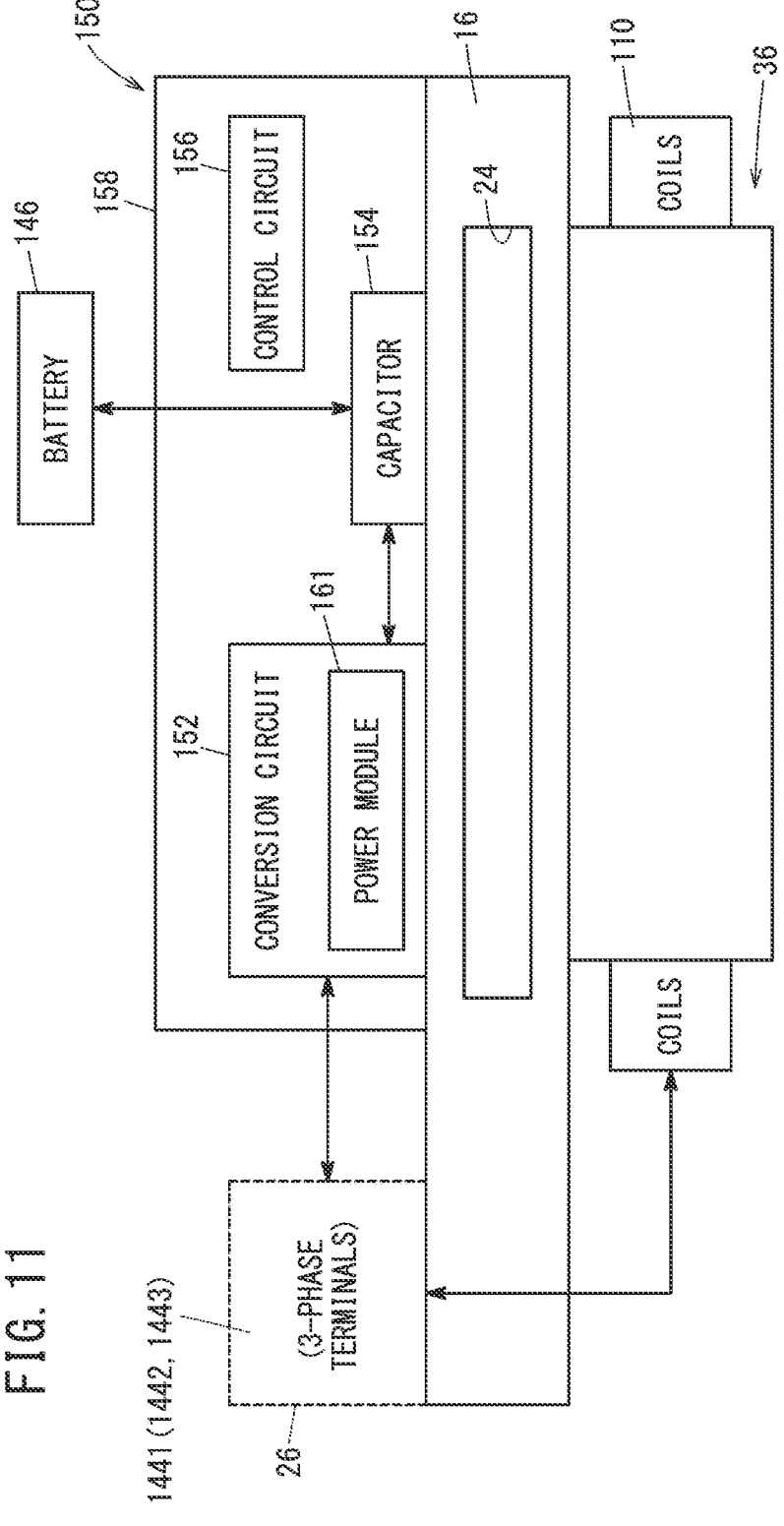
FIG. 11 is a schematic configuration diagram of a current converter provided in a rotating electric machine housing.

As noted previously, the first casing 26 and the second casing 28 are integrally provided on a side wall in proximity to the left end of the main housing 16. A U-phase terminal 1441, a V-phase terminal 1442, and a W-phase terminal 1443 are accommodated in the first casing 26. The U-phase terminal 1441 is electrically connected to the U-phase coil within the electromagnetic coils 110. The V-phase terminal 1442 is electrically connected to the V-phase coil within the electromagnetic coils 110. The W-phase terminal 1443 is electrically connected to the W-phase coil within the electromagnetic coils 110. The U-phase terminal 1441, the V-phase terminal 1442, and the W-phase terminal 1443 are electric terminal portions to which an external device (an external load or an external power source) is electrically connected. Electrical power generated by the rotating electric machine 12 is supplied to the external device. As the external load, for example, there may be cited a non-illustrated motor. Further, as the external device, for example, there may be cited a battery 146 as shown in FIG. 11.

The second casing 28 is adjacent to the first casing 26. A thermistor 148, which serves as a temperature measurement device, is accommodated in the second casing 28. Although not illustrated in particular, measurement terminals of the thermistor 148 are connected to the electromagnetic coils 110 after having been drawn out from the second casing 28. A harness 149 that is connected to the thermistor 148 is drawn out from the second casing 28.

The internal space of the second casing 28 and the internal space of the first casing 26 are placed in communication with each other through a non-illustrated mutual communication hole. Further, the internal space of the first casing 26 is in communication with the accommodation chamber 22.

As shown in FIG. 1 and FIG. 2, an electrical current converter 150 is disposed on the outer circumferential wall of the main housing 16. The electrical current converter 150 is located closer to the gas turbine engine 200 than the first casing 26 is. As shown in FIG. 11, the electrical current converter 150 includes a conversion circuit 152, a capacitor 154, and a control circuit 156. The conversion circuit 152, the capacitor 154, and the control circuit 156 are accommodated inside an equipment case 158. The equipment case 158 is arranged, for example, on the outer circumferential wall of the main housing 16 at a location that does not interfere with a first hollow tube portion 1601, a second hollow tube portion 1602, and a third hollow tube portion 1603 (refer to FIG. 1).

The hollow interior portions of the first hollow tube portion 1601, the second hollow tube portion 1602, and the third hollow tube portion 1603 are relay communication passages through which the compressed air flows. More specifically, according to the present embodiment, three of such relay communication passages are formed in the rotating electric machine housing 14.

The conversion circuit 152 includes a power module 161. The conversion circuit 152 converts an AC current generated by the electromagnetic coils 110 into a DC current. At this time, the capacitor 154 temporarily stores the DC current converted by the conversion circuit 152 as an electric charge. The conversion circuit 152 also possesses a function of converting the DC current delivered from the battery 146 into an AC current. In this case, the capacitor 154 temporarily stores the DC current delivered from the battery 146 toward the electromagnetic coils 110 as an electric charge.

The control circuit 156 controls a current density or the like of the DC current that flows from the capacitor 154 toward the battery 146, or the DC current that flows in the opposite direction. Moreover, the DC current from the battery 146 is supplied to the motor, for example, via an AC-DC converter (neither of which are shown).

Next, a description will be given concerning the compressed air flow passage provided in the rotating electric machine system 10.

Figure 12:
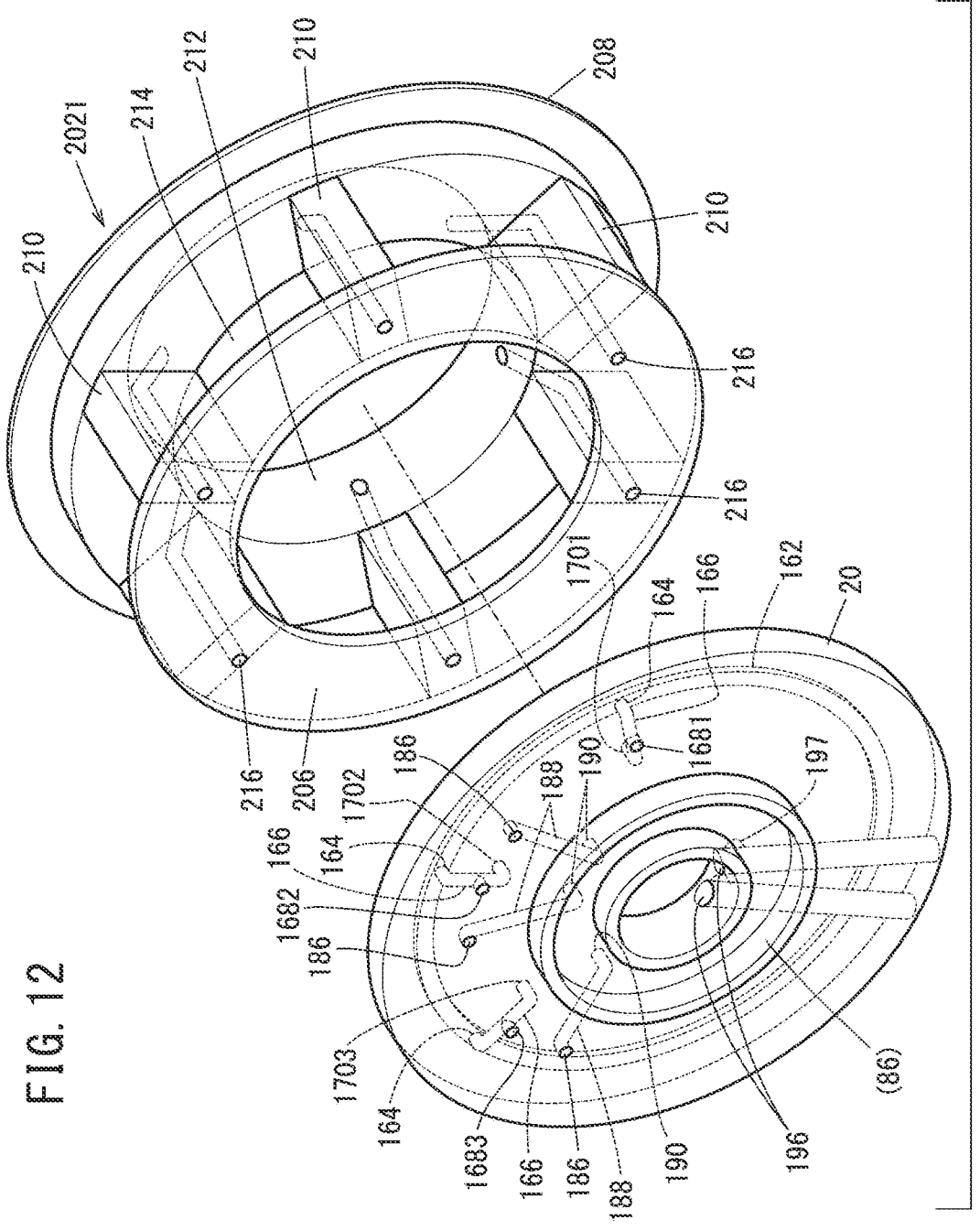
FIG. 12 is a schematic perspective view of a second sub-housing that constitutes part of the rotating electric machine housing, and an inner housing in an engine housing.

As shown in FIG. 12, in the second sub-housing 20, on an end surface thereof facing toward the gas turbine engine 200, an annular shaped collection flow passage 162 made up from an annular shaped concave portion is formed therein. As will be discussed later, a portion of the compressed air generated by the gas turbine engine 200 flows through the collection flow passage 162. Three upstream communication holes 164 are formed in a bottom wall of the collection flow passage 162 (the annular shaped concave portion). The upstream communication holes 164 serve as input ports for the compressed air.

Air relay passages 166 are provided in the interior of the second sub-housing 20. The air relay passages 166 extend along a radial direction of the second sub-housing 20. The air relay passages 166 communicate, on a radially outward side, with the collection flow passage 162 via the upstream communication holes 164. Further, three individual first downstream communication holes 1681 to 1683 are formed in an end surface of the second sub-housing 20 facing toward the rotating electric machine 12. The first downstream communication holes 1681 to 1683 serve as first output ports of the air relay passages 166. A distribution passage is formed by the collection flow passage 162 and the air relay passages 166.

Three individual second downstream communication holes 1701 to 1703 are formed in an end surface of the second sub-housing 20 facing toward the gas turbine engine 200. The second downstream communication holes 1701 to 1703 serve as second output ports of the air relay passages 166. The second downstream communication holes 1701 to 1703 are positioned more inward in a radial direction than the first downstream communication holes 1681 to 1683. Accordingly, the compressed air that flows through the air relay passages 166 is divided into compressed air that enters into the first downstream communication holes 1681 to 1683, and compressed air that enters into the second downstream communication holes 1701 to 1703.

As shown in FIG. 2, the first hollow tube portion 1601 through the third hollow tube portion 1603 are provided on the outer surface of the side wall of the main housing 16. The first downstream communication holes 1681 to 1683 open respectively into the first hollow tube portion 1601 through the third hollow tube portion 1603. As can be understood from this feature, the air relay passages 166 place the collection flow passage 162 in communication with the hollow interior portions of the first hollow tube portion 1601 to the third hollow tube portion 1603. As shown in FIG. 3, the first hollow tube portion 1601 to the third hollow tube portion 1603 are positioned radially outward of the cooling jacket 24 that is formed on the side wall interior of the main housing 16.

The first hollow tube portion 1601 to the third hollow tube portion 1603 extend along the axial direction of the main housing 16. The hollow interior portion of the first hollow tube portion 1601 communicates with the internal space of the second casing 28. The hollow interior portions of the second hollow tube portion 1602 and the third hollow tube portion 1603 communicate with the internal space of the first casing 26. As will be discussed later, a branched air flow that has flowed through the hollow interior portion of the first hollow tube portion 1601 flows into the internal space of the second casing 28. A branched air flow that has flowed through the hollow interior portions of the second hollow tube portion 1602 and the third hollow tube portion 1603 flows into the internal space of the first casing 26. As can be understood from this feature, the first casing 26 and the second casing 28 are arranged more downstream than portions of the first hollow tube portion 1601 to the third hollow tube portion 1603 that are positioned externally of the cooling jacket 24.

As noted previously, the internal space of the first casing 26 and the internal space of the second casing 28 communicate with each other through the mutual communication hole. Further, the internal space of the first casing 26 is in communication with the accommodation chamber 22. Accordingly, the compressed air that has flowed through the first hollow tube portion 1601 to the third hollow tube portion 1603 flows into the accommodation chamber 22 via the first casing 26.

In the present embodiment, although a case is exemplified in which the first hollow tube portion 1601 to the third hollow tube portion 1603 are provided, the number of the hollow tube portions is appropriately determined in accordance with a flow rate or a flow velocity required for the curtain air to be formed from the compressed air. More specifically, the number of the hollow tube portions is not limited to being three. Further, in a similar manner, the cross-sectional area of the hollow tube portions is appropriately determined in accordance with the flow rate or the flow velocity required for the curtain air.

As shown in FIG. 5, the compressed air that has flowed into the accommodation chamber 22 is thereafter divided into compressed air that is directed toward the first insertion hole 78, and compressed air that is directed toward the second insertion hole 86. Specifically, the compressed air flows through the first space 853a between the first sub-housing 18 and the rotor 34, passes through the plurality of the communication holes 856, and is introduced into the inlet side rectifying member 851. In this manner, the first space 853a serves as a first branching passage L (refer to FIG. 3). One portion of the compressed air travels from a left end of the inlet side rectifying member 851 toward the first insertion hole 78. The compressed air directed toward the first insertion hole 78 forms an air curtain which seals the lubricating oil supplied to the first bearing 74.

On the other hand, after the remaining portion of the compressed air has been rectified by passing through the plurality of the inlet side fins 855a of the inlet side rectifying member 851, the compressed air passes through the gas flow passage 72 and the cooling passages 41 and is directed toward the second insertion hole 86. The gas flow passage 72 makes up a second branching passage M that branches off from the first branching passage L.

Specifically, the remaining portion of the compressed air passes through the interior of the first body 854a from the left end of the inlet side rectifying member 851. When the air flows from the left end to the right end of the first body 854a, by the direction changing portions 857a of the plurality of the inlet side fins 855a, the flow of the compressed air is changed from the axial direction to the circumferential direction. At this time, when the compressed air flows out to the downstream side of the inlet side rectifying member 851, the compressed air becomes a swirling flow. The swirling direction of the compressed air is the direction of rotation R (in FIG. 7, the counterclockwise direction) of the rotor 34. The compressed air which has become a swirling flow is introduced into the cooling passages 41 through the plurality of the first opening portions 411 (the inlets 413). At the same time, the compressed air which has become a swirling flow is introduced into the gas flow passage 72 from the left end of the annular shaped gas flow passage 72.

After the compressed air has flowed along the cooling passages 41 and the gas flow passage 72, the compressed air passes from the cooling passages 41 through the second opening portions 412 (the outlets 414), and flows out into the second space 853b. The compressed air flows out from the right end of the gas flow passage 72 into the second space 853b. In the second space 853b, the compressed air passes between the plurality of the outlet side fins 855b of the outlet side rectifying member 852. The direction changing portions 857b of the outlet side fins 855b change the flow of the compressed air from a swirling state to a state of flowing along the axial direction. The compressed air which flows in the axial direction reaches the third sub-branching passage 941 (the second distal end 861 of the second insertion hole 86) from the cooling passages 41 and the gas flow passage 72, and forms an air curtain that seals the lubricating oil supplied to the second bearing 84. In this manner, the compressed air that has flowed into the accommodation chamber 22 functions as an air curtain.

As shown in FIG. 6, three individual introduction ports 104 are formed in the base portion 98 of the guide member 96. One of such introduction ports is shown in FIG. 6. An individual one of the introduction ports 104 connects to the second downstream communication hole 1701 (not shown). Another individual one of the introduction ports 104 connects to the second downstream communication hole 1702 (not shown). Further, another individual one of the introduction ports 104 connects to the second downstream communication hole 1703 (not shown). Accordingly, the compressed air output from the second downstream communication holes 1701 to 1703 enters into the relay chamber 106 of the reduced diameter portion 100 of the guide member 96 via the introduction ports 104.

The relay chamber 106 connects to the insertion hole 108 that is formed in the top portion 102. In this instance, the relay chamber 106 becomes wider as it comes closer to the insertion hole 108 and the fourth sub-branching passage 942. Therefore, as the compressed air flows through the relay chamber 106, the pressure of the branched air flow decreases.

The outlet 414 of the relay chamber 106 faces toward the small diameter cylindrical portion 242 of the compressor wheel 222. Accordingly, the compressed air that has entered into the relay chamber 106 comes into contact with the small diameter cylindrical portion 242 of the compressor wheel 222. Thereafter, the compressed air is divided into compressed air that is directed toward the fourth sub-branching passage 942, and compressed air that is directed toward the outlet passage 943. As a result, the pressure of the compressed air that flows along the fourth sub-branching passage 942 and toward the second proximal end 862 of the second insertion hole 86 is reduced.

The compressed air that has reached the second proximal end 862 of the second insertion hole 86 from the fourth sub-branching passage 942 forms an air curtain which seals the lubricating oil supplied to the second bearing 84. Further, the compressed air that has flowed into the outlet passage 943 is discharged in an inward direction from a first end (an open end) in a shroud case 220. The compressed air is drawn back again into the compressor wheel 222.

An exhaust passage 172 (a first exhaust passage) is formed in the main housing 16. The compressed air that has reached the first branching passage L and the compressed air that has reached the second branching passage M are discharged to the exterior of the main housing 16 through the exhaust passage 172.

The rotating electric machine system 10 is cooled by the lubricating oil passing through non-illustrated lubricating oil flow passages and being circulated to the first and second bearings 74 and 84. The lubricating oil, which is used to lubricate and cool the first and second bearings 74 and 84, is discharged to the exterior of the main housing 16. The compressed air and the lubricating oil that have been supplied to the interior of the rotating electric machine housing 14 are collected in a non-illustrated gas-liquid separation device. The gas-liquid mixture is separated into the air and the lubricating oil. The lubricating oil is discharged from the gas-liquid separation device (not shown) by a non-illustrated circulation pump, and is supplied again to the lubricating oil flow passages. On the other hand, the compressed air is released to the atmosphere through a non-illustrated outlet.

Figure 13:
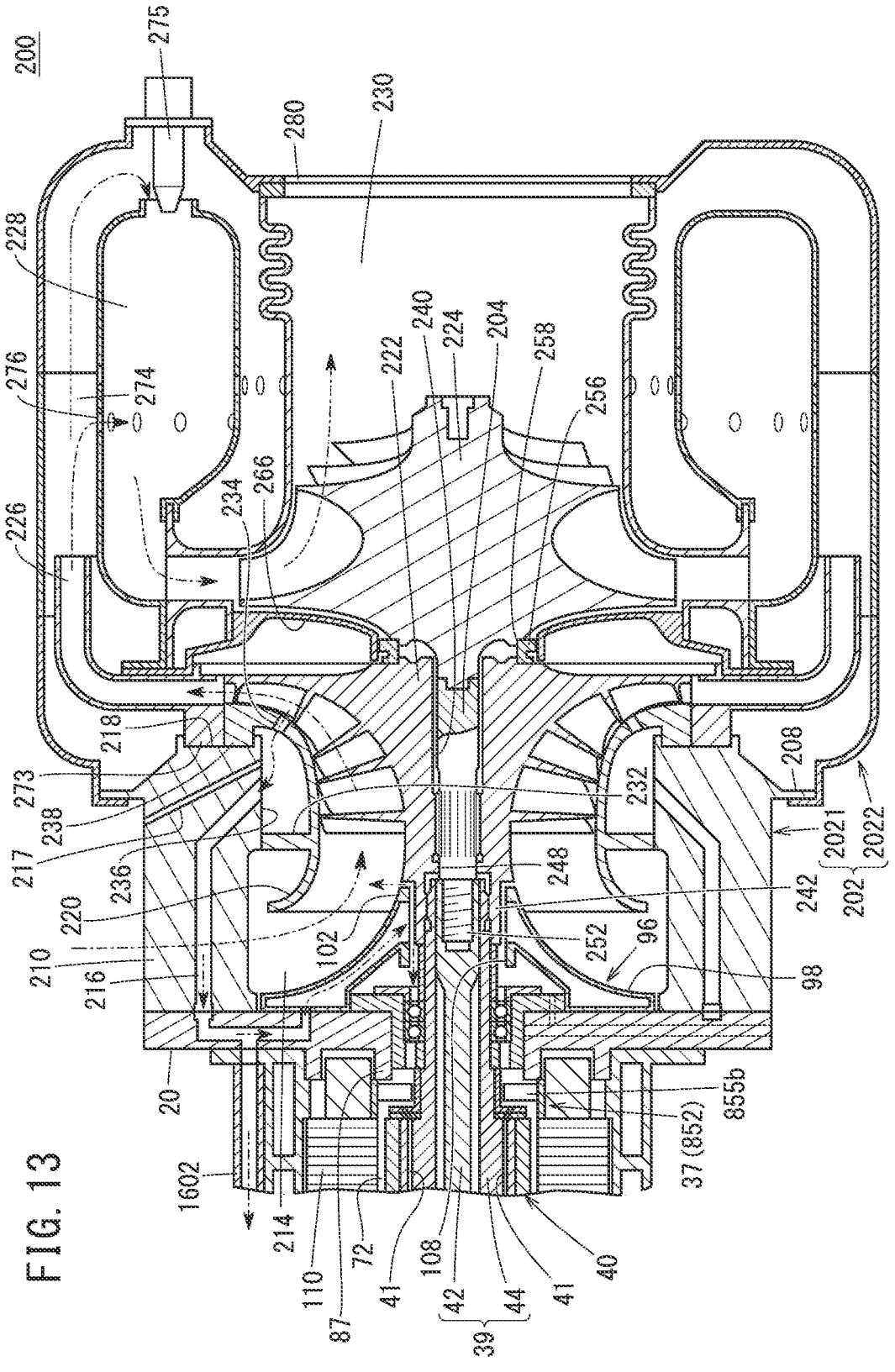
FIG. 13 is a schematic side cross-sectional view of a gas turbine engine constituting part of the combined power system.

Next, a description will be given concerning the gas turbine engine 200. As shown in FIG. 13, the gas turbine engine 200 comprises an engine housing 202, and the output shaft 204 that rotates inside the engine housing 202. The engine housing 202 includes an inner housing 2021 and an outer housing 2022. The inner housing 2021 is connected to the second sub-housing 20 of the rotating electric machine system 10. The outer housing 2022 is connected to the inner housing 2021. The outer housing 2022 forms a housing main body.

As shown in FIG. 1 and FIG. 12, the inner housing 2021 includes a first annular portion 206, a second annular portion 208, and a plurality of individual leg members 210. The first annular portion 206 is connected to the second sub-housing 20. The diameter of the second annular portion 208 is larger than the diameter of the first annular portion 206. The leg members 210 connect the first annular portion 206 and the second annular portion 208. In the illustrated example, the number of the leg members 210 is six. However, the number of the leg members 210 is determined in accordance with the necessary coupling strength required between the gas turbine engine 200 and the rotating electric machine system 10. Stated otherwise, the number of the leg members 210 is not limited to being six as in the illustrated example.

A cylindrically shaped cover member 212 projects out toward the rotating electric machine system 10 from a central opening of the second annular portion 208. Right ends of the leg members 210 continue to both sides of the cylindrically shaped cover member 212. An air intake space 214 is formed between the leg members 210.

As shown in FIG. 12 and FIG. 13, air bleed passages 216 are individually formed in the interior of the six individual leg members 210. In the leg members 210, inlets 413 of the air bleed passages 216 are individually formed at connection locations thereof with the cylindrically shaped cover member 212. In the first annular portion 206, outlets 414 of the air bleed passages 216 are individually formed on the end surface facing toward the second sub-housing 20. All of the outlets 414 of the air bleed passages 216 are positioned on the circumference of a virtual circle. Accordingly, all of the outlets 414 of the air bleed passages 216 are superimposed on the collection flow passage 162 which is formed in an annular shape. More specifically, all of the plurality of air bleed passages 216 are in communication with the collection flow passage 162. In this manner, the compressed air from the plurality of air bleed passages 216 flows in and is gathered in the collection flow passage 162.

Air vent holes 217 are formed in the leg members 210. The air vent holes 217 extend linearly from an inner wall to an outer wall of the cylindrically shaped cover member 212. The air vent holes 217 are also capable of extending from an inner wall of the cylindrically shaped cover member 212 to the outer walls of the leg members 210. The number of the air vent holes 217 may be one individual air vent hole or a plurality of individual air vent holes. Further, formation of the air vent holes 217 is not strictly essential.

As shown in FIG. 13, an annular shaped engaging concave portion 218 is formed on a right end surface of the second annular portion 208. The shroud case 220 and a diffuser 226 are positioned and fixed in place by the engaging concave portion 218.

The gas turbine engine 200 is further equipped with the shroud case 220, the compressor wheel 222, the turbine wheel 224, the diffuser 226, a combustor 228, and a nozzle 230.

The shroud case 220 is a hollow body, and is of a larger scale in comparison with the guide member 96. A small diameter left end of the shroud case 220 faces toward the guide member 96. A large diameter right end of the shroud case 220 is inserted into the cylindrically shaped cover member 212 of the inner housing 2021. The shroud case 220 gradually decreases in diameter from the right end toward the left end, however, the distal end of the left end thereof is curved so as to expand toward an outer side in the radial direction.

The left end of the shroud case 220 is exposed to the air intake space 214. The top portion 102 of the guide member 96 enters into the interior of the shroud case 220 at the left end thereof. An annular shaped closing flange portion 232 is provided on a curved side circumferential wall of the shroud case 220. An outer edge of the closing flange portion 232 abuts against the inner walls of the cylindrically shaped cover member 212 and the leg members 210.

In the side wall of the shroud case 220, air bleed ports 234 are formed between the closing flange portion 232 and a first engaging convex portion 238. The air bleed ports 234 extend from the inner surface to the outer surface of the side wall of the shroud case 220. The air bleed ports 234 serve as the inlets 413 to a chamber 236 when the compressed air enters into the chamber 236.

The chamber 236 is interposed between the air bleed ports 234 and the air bleed passages 216. More specifically, the chamber 236 allows the air bleed ports 234 and the air bleed passages 216 to communicate with each other. Further, the chamber 236 is open to the atmosphere through the air vent holes 217.

From the right end of the shroud case 220, the first engaging convex portion 238 projects out toward the second annular portion 208. The first engaging convex portion 238 engages with the engaging concave portion 218 of the second annular portion 208. Due to such engagement and the outer edge of the closing flange portion 232 coming into abutment against the inner walls of the cylindrically shaped cover member 212 and the leg members 210, the shroud case 220 is positioned and fixed in place in the inner housing 2021. At the same time, the chamber 236 is formed, which is surrounded by the leg members 210, the cylindrically shaped cover member 212, the second annular portion 208, and the closing flange portion 232, the side circumferential wall, and the first engaging convex portion 238 of the shroud case 220. The chamber 236 exhibits an annular shape which surrounds the shroud case 220.

The compressor wheel 222 and the turbine wheel 224 are capable of rotating integrally together with the rotating shaft 39 and the output shaft 204. More specifically, as shown in FIG. 6, the compressor wheel 222 includes the small diameter cylindrical portion 242 at the left end thereof. The small diameter cylindrical portion 242 enters into the insertion hole 108 that is formed in the guide member 96. A first outer spline 239 is formed on the inner wall of the small diameter cylindrical portion 242. The first outer spline 239 is enmeshed with the first inner spline 66 formed on the right open end 442 of the outer shaft 44.

The right open end 442 of the outer shaft 44 is press-fitted into a hollow interior portion of the small diameter cylindrical portion 242. Therefore, the inner circumferential wall of the left opening of the small diameter cylindrical portion 242 presses the outer circumferential wall of the right open end 442 of the outer shaft 44 inwardly in the radial direction. Due to the enmeshment and press-fitting described above, the compressor wheel 222 is connected to the outer shaft 44 (the rotating shaft 39).

A through hole 240 that extends along the left-right direction is formed in a diametrical center of the compressor wheel 222. In the through hole 240, a second outer spline 246 is engraved into the inner wall of the left end thereof. Further, a hole diameter of the through hole 240 at a location contiguous with the hollow interior portion of the small diameter cylindrical portion 242 is slightly smaller than that of other locations. Therefore, an inner flange portion 248 of the compressor wheel 222 is provided in proximity to an opening on the side of the small diameter cylindrical portion 242 of the through hole 240. At the portion where the inner flange portion 248 is provided, the hole diameter (diameter) of the through hole 240 is smallest.

The output shaft 204 provided on the turbine wheel 224 is inserted into the through hole 240. The distal end of the left end of the output shaft 204 extends out substantially to the same position as the distal end of the left end of the small diameter cylindrical portion 242 of the compressor wheel 222. As noted previously, the right open end 442 of the outer shaft 44 is press-fitted into the hollow interior portion of the small diameter cylindrical portion 242. Therefore, the left end of the output shaft 204, which is projected out from the through hole 240, enters into the connecting hole 62 of the rotating shaft 39. A male threaded portion 252 is engraved on the left end of the output shaft 204. The male threaded portion 252 is screw-engaged with the female threaded portion 64 that is formed on the inner wall of the connecting hole 62. Due to such screw-engagement, the rotating shaft 39 and the output shaft 204 are connected.

A second inner spline 254 is formed in proximity to the left end of the output shaft 204. The second inner spline 254 is enmeshed with the second outer spline 246 that is formed on the inner circumferential wall of the through hole 240. Further, a left end part of the output shaft 204 is press-fitted into the inner flange portion 248.

As shown in FIG. 13, a ring member 256 is interposed between the compressor wheel 222 and the turbine wheel 224. The ring member 256, for example, is made up from a heat resistant metal material such as a nickel-based alloy or the like.

Figure 14:
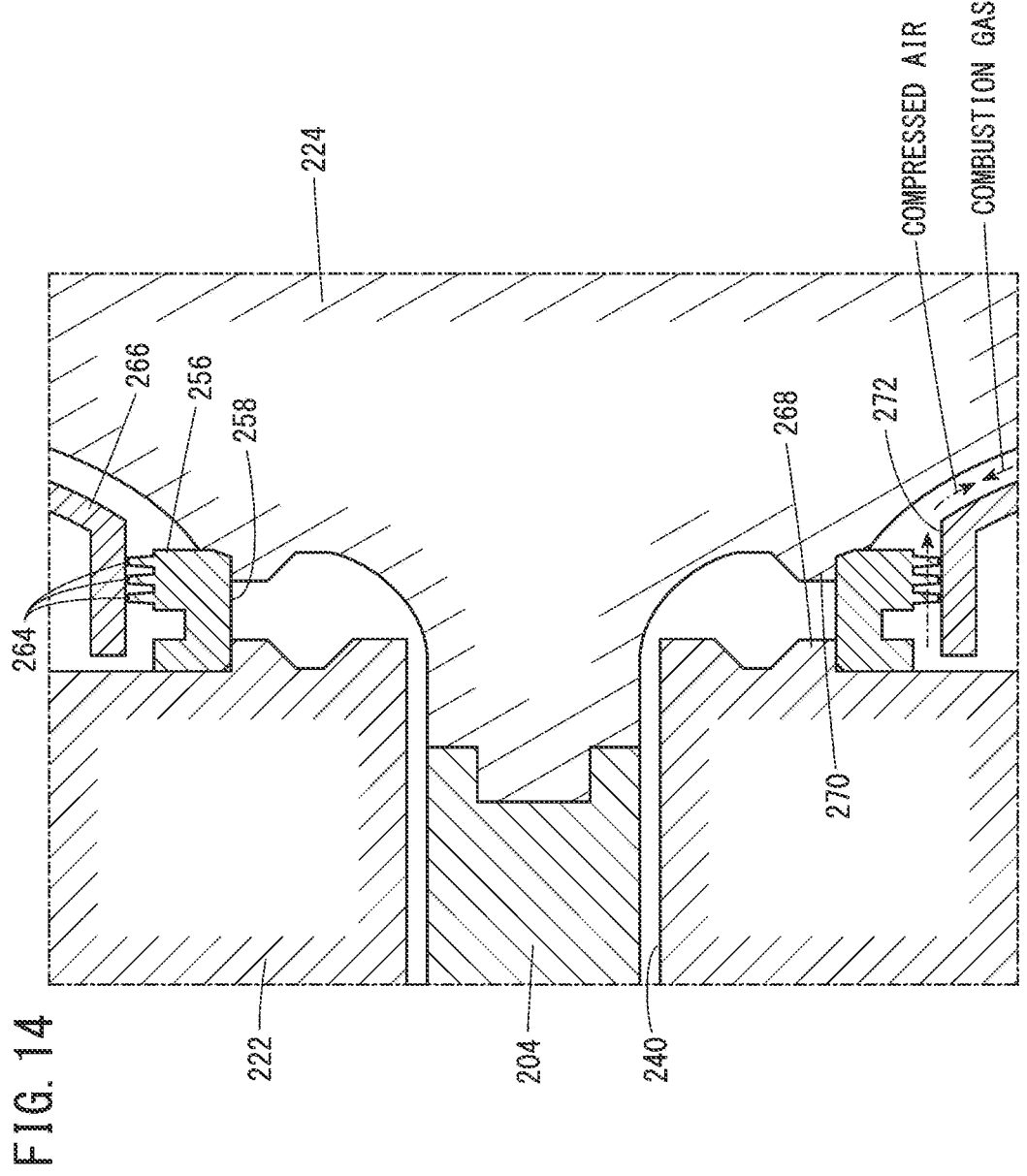
FIG. 14 is an enlarged view of principal components of the gas turbine engine shown in FIG. 13.

As shown in FIG. 14, the ring member 256 is formed with a fitting hole 258 therein that extends from the compressor wheel 222 toward the turbine wheel 224. Further, a plurality of (for example, three) labyrinth forming convex portions 264 are formed on the outer circumferential wall of the ring member 256. The labyrinth forming convex portions 264 project out toward an outer side in the radial direction of the ring member 256, and in addition, extend along the circumferential direction of the outer circumferential wall. As will be discussed later, the labyrinth forming convex portions 264 prevent a combusted fuel (an exhaust gas) generated in the combustor 228 from flowing back into the compressor wheel 222.

An annular shaped projecting portion 268 of the compressor wheel 222 projects out from the right end surface that faces toward the turbine wheel 224. At a time when the left end surface of the ring member 256 is seated on the right end surface of the compressor wheel 222, the annular shaped projecting portion 268 is fitted into the fitting hole 258. On the other hand, the output shaft 204 extends out from the left end surface of the turbine wheel 224 that faces toward the compressor wheel 222. Further, a fitting convex portion 270 surrounding the output shaft 204 is formed to project out on the left end surface. At a time when the right end surface of the ring member 256 is seated on the left end surface of the turbine wheel 224, the top surface of the fitting convex portion 270 is fitted into the fitting hole 258. In accordance with the foregoing, the respective parts of the compressor wheel 222 and the turbine wheel 224 are fitted into the fitting hole 258. In such a state, the ring member 256 is sandwiched between the compressor wheel 222 and the turbine wheel 224.

The labyrinth forming convex portions 264 are surrounded by an intermediate plate 266 in the hollow interior portion of the outer housing 2022 (refer to FIG. 13). The labyrinth forming convex portions 264 are inserted into a hole portion 272 that is formed in the intermediate plate 266. A labyrinth flow passage is formed by the inner wall of the hole portion 272 and the labyrinth forming convex portions 264 that abut against the inner wall. The compressed air generated by the compressor wheel 222 reaches the labyrinth forming convex portions 264 via a rear surface of the compressor wheel 222. On the other hand, the combustion gas reaches the labyrinth forming convex portions 264 from the turbine wheel 224. Since the pressure of the compressed air is higher in comparison with the pressure of the combustion gas, it is possible to prevent the combustion gas from passing through the labyrinth forming convex portions 264 and flowing into the space surrounding the compressor wheel 222.

As shown in FIG. 13, within the hollow interior portion of the outer housing 2022, respective portions of the shroud case 220 and the compressor wheel 222, as well as the intermediate plate 266 are surrounded by the diffuser 226. A second engaging convex portion 273 is formed on the left end of the diffuser 226. The second engaging convex portion 273 is engaged with the engaging concave portion 218 together with the first engaging convex portion 238 of the shroud case 220. Due to such engagement, the diffuser 226 is positioned and fixed in place in the inner housing 2021.

Within the hollow interior portion of the outer housing 2022, the turbine wheel 224 is surrounded by the nozzle 230, and further, the nozzle 230 is surrounded by the combustor 228. An annular shaped combustion air flow passage 274 is formed between the combustor 228 and the outer housing 2022. The combustion air flow passage 274 is a passage through which the combustion air flows. A fuel supply nozzle 275 is positioned and fixed to a right end surface of the outer housing 2022. The fuel supply nozzle 275 supplies the fuel to the combustor 228.

Relay holes 276 in order to place the combustion air flow passage 274 and the interior of the combustor 228 in communication with each other are formed in the combustor 228. As will be discussed later, the combustion air that is compressed by the compressor wheel 222 reaches the interior of the combustor 228 via the diffuser 226, the combustion air flow passage 274, and the relay holes 276. Non-illustrated fine holes are also formed in the combustor 228. Air discharged from the fine holes forms an air curtain that serves to cool the interior of the combustor 228.

The nozzle 230 includes a portion that surrounds the largest diameter portion of the turbine wheel 224. A non-illustrated delivery hole is formed in this portion for the purpose of supplying the fuel, which has undergone combustion together with the combustion air, to the turbine wheel 224. Moreover, it should be noted that, hereinafter, the fuel that has undergone combustion may also be referred to as a "combusted fuel". The term "combusted fuel" is synonymous with the term "combustion gas" or the "exhaust gas after combustion".

An exhaust port 280 opens at the right end of the outer housing 2022 and the nozzle 230. After having passed through the delivery hole and into the nozzle 230, by the rotating turbine wheel 224, the combusted fuel is blown out to the exterior of the outer housing 2022 through the exhaust port 280. Moreover, although not shown in particular, an exhaust pipe through which the combusted fuel is discharged is provided in the exhaust port 280.

The combined power system 400 according to the present embodiment is basically configured in the manner described above. Next, a description will be given concerning the advantageous effects of the combined power system 400. Hereinafter, a description will be given concerning a case in which the rotor 34 of the rotating electric machine system 10 rotates in a counterclockwise direction (the direction of rotation R) when viewed from the left end of the rotor 34 shown in FIG. 7.

Initially, a DC current is supplied from the battery 146. The conversion circuit 152 of the electrical current converter 150 shown in FIG. 2 and FIG. 11 converts such a DC current into an AC current. The AC current is supplied to the electromagnetic coils 110 (the U-phase coil, the V-phase coil, and the W-phase coil) via the U-phase terminal 1441, the V-phase terminal 1442, and the W-phase terminal 1443. By the AC current flowing through the electromagnetic coils 110, an alternating magnetic field is generated in the stator 36. Therefore, an attraction force and a repulsion force act alternately between the electromagnetic coils 110 and the magnets 38 of the rotor 34. As a result, the rotating shaft 39 begins to rotate in the direction of rotation R. Alternatively, the rotating shaft 39 may be rotated by a well known type of starter (not shown).

In this instance, as shown in FIG. 6, the first inner spline 66 is formed on the outer circumferential wall of the right open end 442 of the outer shaft 44, and further, the first outer spline 239 is formed on the inner wall of the small diameter cylindrical portion 242 of the compressor wheel 222. The first inner spline 66 and the first outer spline 239 are enmeshed with one another. Further, the second inner spline 254 is formed on the output shaft 204, and the second outer spline 246 is formed on the inner wall of the through hole 240 of the compressor wheel 222. The second inner spline 254 and the second outer spline 246 are enmeshed with one another. Therefore, a rotational torque of the rotating shaft 39 is rapidly transmitted to the output shaft 204 via the compressor wheel 222.

More specifically, when the rotating shaft 39 begins to rotate in the direction of rotation R, the output shaft 204 also starts rotating integrally together with the rotating shaft 39.

Along therewith, the compressor wheel 222 and the turbine wheel 224, which are supported by the output shaft 204, rotate integrally together with the output shaft 204. In the foregoing manner, by the first inner spline 66 and the first outer spline 239 being enmeshed, and by the second inner spline 254 and the second outer spline 246 being enmeshed, the rotational torque of the rotating shaft 39 can be sufficiently transmitted to the output shaft 204.

In addition, the right end part of the rotating shaft 39 is press-fitted into the hollow interior portion of the small diameter cylindrical portion 242 of the compressor wheel 222. Further, the left end part of the output shaft 204 is press-fitted into the inner flange portion 248 of the compressor wheel 222. Therefore, the axis of the rotating shaft 39 and the axis of the output shaft 204 coincide precisely. In accordance with this feature, the output shaft 204 is sufficiently prevented from rotating in an eccentric manner, or rotating while being subjected to vibrations.

Additionally, as shown in FIG. 14, the ring member 256 is interposed between the compressor wheel 222 and the turbine wheel 224. The annular shaped projecting portion 268 on the right end surface of the compressor wheel 222, and the fitting convex portion 270 on the left end surface of the turbine wheel 224 are fitted into the fitting hole 258 of the ring member 256. These fittings also contribute to suppressing eccentric rotation (vibration) of the output shaft 204. Accordingly, there is no need to provide a mechanism for suppressing vibration. Further, there is no need to increase the diameter of the output shaft 204. In accordance with this feature, it is possible to reduce the size and scale of the combined power system 400.

Furthermore, a frictional force is generated between the right end surface of the compressor wheel 222 and the left end surface of the ring member 256. A frictional force is also generated between the right end surface of the ring member 256 and the left end surface of the turbine wheel 224. Due to such frictional forces, the compressor wheel 222, the ring member 256, and the turbine wheel 224 are kept in close contact with each other. Accordingly, a situation is avoided in which rotational misalignment arises between the wheels 222 and 224.

Further still, when the combined power system 400 is assembled, due to the above-described fitting, the compressor wheel 222 and the turbine wheel 224 are positioned (centered) with respect to the output shaft 204. In this manner, the ring member 256 is preferably disposed between both of the wheels 222 and 224, and both of the wheels 222 and 224 are preferably fitted individually into the fitting hole 258 of the ring member 256. In accordance with this feature, it becomes easy to center the compressor wheel 222 and the turbine wheel 224 with respect to the output shaft 204.

Due to the above-described rotation, as shown in FIG. 13, atmospheric air is drawn into the shroud case 220 through the air intake space 214 formed between the leg members 210 of the inner housing 2021. In this instance, the guide member 96 is positioned at the diametrical center of the inner housing 2021. As noted previously, the guide member 96 exhibits a mountain (chevron) shape that becomes smaller in diameter following along the shroud case 220. In addition, the surface of the reduced diameter portion 100 is smooth. Therefore, the drawn in atmospheric air is rectified by the guide member 96 in a manner so as to flow toward the shroud case 220. Since the right end of the guide member 96 enters from the left end opening of the shroud case 220, the atmospheric air is efficiently introduced into the shroud case 220. In this manner, by the guide member 96 being shaped in the manner described above, and by the top portion 102 being made to enter into the shroud case 220, the atmospheric air can be efficiently collected by the shroud case 220.

The atmospheric air that is drawn into the shroud case 220 flows between the compressor wheel 222 and the shroud case 220. From the fact that, in comparison with the left opening of the shroud case 220, the space between the compressor wheel 222 and the shroud case 220 is sufficiently narrow, when flowing therethrough, the atmospheric air is compressed. Stated otherwise, the compressed air is generated.

The air bleed ports 234 are formed in the shroud case 220. Therefore, a portion of the compressed air branches off from the air bleed ports 234 and flows into the chamber 236. The chamber 236 is formed in an annular shape, and includes a larger volume in comparison with the volume of the air bleed ports 234. Therefore, the branched air flow that has flowed into the chamber 236 is temporarily stored in the chamber 236.

From the fact that the plurality of individual air bleed passages 216 are formed, the compressed air is distributed from the chamber 236 to each of the air bleed passages 216. In this case, the branched air flow itself that is distributed may differ in pressure. However, according to the present embodiment, the compressed air that has passed through the air bleed ports 234 flows into the single individual chamber 236 that is formed in an annular shape. Consequently, the pressure of the branched air flow inside the chamber 236 is uniform. Stated otherwise, the pressure of the branched air flow is equalized. In this manner, the chamber 236 serves as a pressure regulation chamber that regulates the pressure of the branched air flow to be substantially constant.

The branched air flow that has flowed in from the air bleed ports 234, as has been discussed previously, makes up a portion of the compressed air, and is high in pressure. In this instance, since the volume of the chamber 236 is larger than the volume of the air bleed ports 234, the branched air flow spreads out as it flows into the chamber 236. Therefore, the pressure of the branched air flow is lowered. As can be understood from this feature, the chamber 236 also serves in a dual manner as a buffer chamber that causes the pressure of the compressed air to be reduced.

In addition to the air bleed passages 216, the air vent holes 217 are formed in the inner housing 2021. Excessive compressed air is released to the exterior (the atmosphere) of the gas turbine engine 200 through the air vent holes 217. Therefore, an excessive increase in the pressure of the branched air flow inside the chamber 236 is avoided. More specifically, due to the air vent holes 217, the pressure inside the chamber 236 can be easily adjusted.

Opening into the chamber 236 are inlets 413 of the air bleed passages 216 that are individually formed in each of the six leg members 210. Therefore, next, the branched air flow inside the chamber 236 flows individually through the six air bleed passages 216, and in accordance therewith, travels toward the second sub-housing 20. As noted previously, at this point in time, the pressure of the branched air flow is substantially constant.

As shown in FIG. 12, the outlets 414 of all of the six individual air bleed passages 216 overlap with the collection flow passage 162. Accordingly, the branched air flow that has flowed through the six individual air bleed passages 216 flows in and is collected in the collection flow passage 162, and in addition, spreads out in an annular shape along the collection flow passage 162. In this process, the pressure of the branched air flow is made more uniform.

Furthermore, the branched air flow flows individually from the collection flow passage 162 into the three individual upstream communication holes 164, and separately flows along the three individual air relay passages 166. Thereafter, one portion of the branched air flow is discharged from the first downstream communication holes 1681 to 1683. Further, a remaining portion of the branched air flow is discharged from the second downstream communication holes 1701 to 1703. Hereinafter, the branched air flow that is discharged from the first downstream communication holes 1681 to 1683 will be referred to as a "first branched air flow". The branched air flow that is discharged from the second downstream communication holes 1701 to 1703 will be referred to as a "second branched air flow".

A description will now be given concerning a route of the first branched air flow. The first downstream communication hole 1681 communicates with the hollow interior portion of the first hollow tube portion 1601. The first downstream communication hole 1682 communicates with the hollow interior portion of the second hollow tube portion 1602. The first downstream communication hole 1683 communicates with the hollow interior portion of the third hollow tube portion 1603. Accordingly, the first branched air flow flows through the first hollow tube portion 1601 to the third hollow tube portion 1603 shown in FIG. 1, etc., and flows from the second end to the first end of the rotating electric machine housing 14.

The first hollow tube portion 1601 to the third hollow tube portion 1603 are positioned on an outer circumferential portion of the cooling jacket 24. The cooling medium is allowed to flow in advance through the cooling jacket 24. Accordingly, the heat of the first branched air flow is sufficiently conducted to the cooling medium as the first branched air flow flows along the first hollow tube portion 1601 to the third hollow tube portion 1603. Consequently, the first branched air flow becomes a relatively low temperature. More specifically, according to the present embodiment, in accordance with the cooling jacket 24 that serves in order to cool the rotating electric machine 12, the electrical current converter 150, and the like, the temperature of the first branched air flow can also be lowered. Therefore, there is no need to separately provide cooling equipment in order to cool the curtain air in the gas turbine engine 200 or the rotating electric machine system 10. Accordingly, it is possible to reduce the size and scale of the combined power system 400.

The first branched air flow that has flowed through the first hollow tube portion 1601, as shown in FIG. 2, flows into the internal space of the second casing 28. Consequently, the air curtain is formed inside the second casing 28. A surplus amount of the first branched air flow flows through the mutual connecting holes into the internal space of the first casing 26. The first branched air flow that has flowed through each of the second hollow tube portion 1602 and the third hollow tube portion 1603 flows into the internal space of the first casing 26. Accordingly, inside the first casing 26, an air curtain is formed by the first branched air flow that has flowed through the first hollow tube portion 1601 to the third hollow tube portion 1603.

A surplus amount of the first branched air flow inside the first casing 26, as shown in FIG. 3, flows into the accommodation chamber 22 that is formed in the main housing 16. As can be understood from this feature, the internal spaces of the first casing 26 and the second casing 28 are located upstream in the flow path of the first branched air flow. The accommodation chamber 22 of the main housing 16 is located downstream in the flow path of the first branched air flow.

The first casing 26 and the second casing 28 are disposed at the first end (the left end) of the main housing 16. Therefore, the first branched air flow flows in from the left end of the accommodation chamber 22. Thereafter, the first branched air flow enters into a clearance between the outer circumferential wall of the columnar shaped projecting portion 76 and the insulating substrates 112. Such a clearance serves as the inner hole of the stator 36.

Thereafter, the first branched air flow passes through the communication holes 856, and is introduced into the inlet side rectifying member 851 arranged in the first branching passage L (the first space 853a). One portion of the first branched air flow flows toward the first insertion hole 78 from the left end of the first body 854a of the inlet side rectifying member 851. The one portion of the first branched air flow that has flowed toward the first insertion hole 78 reaches the first proximal end 782 of the first insertion hole 78. In the first proximal end 782, the one portion of the first branched air flow becomes an air curtain for the first bearing 74. The one portion of the first branched air flow is not rectified by the inlet side rectifying member 851.

The remaining portion of the first branched air flow passes through the interior of the first body 854a from the left end toward the right end of the inlet side rectifying member 851. The first branched air flow is introduced along the axial direction with respect to the inlet side rectifying member 851. The first branched air flow flows from the first fin ends 858a toward the second fin ends 859a of the plurality of the inlet side fins 855a along the direction changing portions 857a. Consequently, the first branched air flow becomes a swirling flow that gradually swirls in a counterclockwise direction when viewed from the left end of the rotating shaft 39 shown in FIG. 7 and FIG. 9. The first branched air flow is discharged while swirling toward the downstream side from the second fin ends 859a of the inlet side fins 855a. More specifically, by the first branched air flow passing through the inlet side rectifying member 851, the first branched air flow swirls in the same direction as the direction of rotation R of the rotor 34. The remaining portion of the first branched air flow that has become a swirling flow is supplied to the gas flow passage 72, which is the second branching passage M, and to the cooling passages 41 of the rotating shaft 39. The remaining portion of the first branched air flow flows along the annular shaped gas flow passage 72 toward the right end of the rotating shaft 39. The remaining portion of the first branched air flow is introduced into the interior of each of the cooling passages 41 through the first opening portions 411 (the inlets 413), and flows along the cooling passages 41 toward the right end of the rotating shaft 39. Since the first branched air flows swirls in the same direction as the direction of rotation of the rotor 34, the first branched air flow smoothly flows into each of the cooling passages 41 and the gas flow passage 72.

The remaining portion of the first branched air flow flows in the axial direction toward the right end of the gas flow passage 72. The remaining portion of the first branched air flow flows in the axial direction along the parallel portions 455 from the first opening portions 411 (the inlets 413) of the plurality of the cooling passages 41. At this time, due to the centrifugal force generated accompanying the rotation of the rotor 34, a negative pressure is generated from the inclined portions 456 toward the second opening portions 412 (the outlets 414). Due to such a negative pressure, flowing of the compressed air from the parallel portions 455 toward the inclined portions 456 is promoted, and the compressed air smoothly flows toward the outlets 414.

The first branched air flow flows out from the right end of the gas flow passage 72 and the second opening portions 412 of the cooling passages 41 into the interior of the outlet side rectifying member 852 of the second space 853b. In accordance with this feature, the rotor 34 and the magnets 38 are effectively cooled by the first branched air flow that flows through the plurality of the cooling passages 41. By the first branched air flow that flows through the gas flow passage 72, the rotor 34 including the magnets 38 and the stator 36 are effectively cooled.

In the second space 853b, the remaining portion of the first branched air flow flows along the direction changing portions 857b toward the first fin ends 858b from the second fin ends 859b of the outlet side fins 855b of the outlet side rectifying member 852. The remaining portion of the first branched air flow is rectified by the plurality of the outlet side fins 855b, and a swirling force of the compressed air directed toward the same direction as the direction of rotation R of the rotor 34 gradually decreases. The remaining portion of the first branched air flow changes into a linear flow that flows along the axial direction, and flows to the downstream side. After the first branched air flow is rectified by the outlet side rectifying member 852, the first branched air flow passes through the third sub-branching passage 941, and reaches the second distal end 861 of the second insertion hole 86. In the second distal end 861, the remaining portion of the first branched air flow becomes an air curtain for the second bearing 84.

In this manner, the first branched air flow branches into compressed air that flows toward the first insertion hole 78 at the left end (the first end), and compressed air that flows toward the second insertion hole 86 at the right end (the second end). Thereafter, the first branched air flow arrives at the exhaust passage 172 of the main housing 16 together with the second branched air flow, which will be described later.

A description will now be given concerning a route of the second branched air flow. The second downstream communication holes 1701 to 1703 individually overlap with the three individual introduction ports 104 that are formed in the base portion 98 of the guide member 96. Accordingly, the second branched air flow flows into the relay chamber 106 (the hollow interior portion of the guide member 96) through the introduction ports 104.

As noted previously, the outlets 414 of the relay chamber 106 open at a position that faces toward the small diameter cylindrical portion 242 of the compressor wheel 222. Accordingly, the second branched air flow that has flowed into the relay chamber 106 comes into contact with the small diameter cylindrical portion 242. Thereafter, one portion of the second branched air flow flows toward the fourth sub-branching passage 942. The remaining portion of the second branched air flow flows toward the outlet passage 943.

The one portion of the second branched air flow reaches the second proximal end 862 of the second insertion hole 86 via the fourth sub-branching passage 942. In the second proximal end 862, the one portion of the second branched air flow becomes an air curtain for the second bearing 84. In this manner, the second bearing 84 is sandwiched between the remaining portion of the second branched air flow that has reached the second proximal end 862, and the portion of the first branched air flow that has reached the second distal end 861.

The remaining portion of the second branched air flow passes through the outlet passage 943 and is discharged into the interior of the left end of the shroud case 220. At the left end opening of the shroud case 220, the air is drawn in as noted previously. Accordingly, the remaining portion of the second branched air flow is compressed by the compressor wheel 222 along with the drawn in atmospheric air.

A surplus amount of the first branched air flow passes through the accommodation chamber 22 and reaches the exhaust passage 172. A surplus amount of the second branched air flow flows from the second end to the first end of the main housing 16, for example, via a clearance between the inner wall of the accommodation chamber 22 and the electromagnetic coils 110. Thereafter, the surplus amount of the second branched air flow reaches the exhaust passage 172. The first branched air flow and the second branched air flow that have arrived at the exhaust passage 172 are recovered by the non-illustrated gas-liquid separation device.

As noted previously, due to the chamber 236 being provided between the inner housing 2021 and the shroud case 220, the pressure of the curtain air is equalized. Accordingly, the occurrence of a pressure distribution in the curtain air is avoided. Further, the occurrence of surging in the curtain air is also avoided. Therefore, while the pressure of the curtain air is maintained substantially constant, it is possible to supply the curtain air circumferentially around the first bearing 74 and the second bearing 84.

As noted previously, the relay chamber 106 becomes wider as it comes closer to the fourth sub-branching passage 942. In addition, the second branched air flow that has flowed out from the relay chamber 106 is divided into a portion that is directed toward the fourth sub-branching passage 942, and a remaining portion that is directed toward the outlet passage 943. Accordingly, the pressure of the second branched air flow that has reached the second proximal end 862 is less than the pressure of the second branched air flow prior to entering into the relay chamber 106. As a result, the pressure of the first branched air flow that has reached the second distal end 861, and the pressure of the second branched air flow that has reached the second proximal end 862 are in balance.

The compressed air that has passed between the shroud case 220 and the compressor wheel 222 without entering into the air bleed ports 234 becomes the combustion air. As shown in FIG. 13, the combustion air enters into the diffuser 226. The combustion air flows out from an outlet hole that is formed in a wall portion of the diffuser 226, and into the combustion air flow passage 274 formed between the combustor 228 and the outer housing 2022. Furthermore, the combustion air flows into the combustion chamber (the hollow interior portion of the combustor 228) through the relay holes 276 and the fine holes that are formed in the combustor 228, and a clearance between the combustor 228 and the fuel supply nozzle 275.

The combustor 228 is placed in a state of being heated beforehand. Accordingly, the combustion chamber is also at a high temperature. Fuel is supplied from the fuel supply nozzle 275 to the high temperature combustion chamber. The fuel undergoes combustion together with the combustion air, and results in a high temperature combusted fuel. At a time when the combusted fuel is supplied into the nozzle 230 from the delivery hole, the combusted fuel expands inside the nozzle 230. Consequently, the turbine wheel 224 begins to rotate at a high speed.

The output shaft 204 retains the turbine wheel 224. Further, the compressor wheel 222 is also provided on the output shaft 204. Accordingly, accompanying the turbine wheel 224 being rotated at a high speed, the output shaft 204 and the compressor wheel 222 rotate together at a high speed. At the same time, the rotating shaft 39 also rotates at a high speed. Moreover, the combusted fuel is discharged to the exterior of the outer housing 2022 through a non-illustrated exhaust pipe provided in the exhaust port 280.

The ring member 256, which is interposed between the compressor wheel 222 and the turbine wheel 224, serves as a sealing member for sealing the space between both of the wheels 222 and 224. In addition, as shown in FIG. 14, the plurality of individual labyrinth forming convex portions 264 are formed on the outer circumferential wall of the ring member 256. The labyrinth forming convex portions 264 abut against the inner wall of the hole portion 272 formed in the intermediate plate 266. The compressed air generated by the compressor wheel 222 reaches the labyrinth forming convex portions 264 via a rear surface of the compressor wheel 222. Further, the combustion gas reaches the labyrinth forming convex portions 264 from the turbine wheel 224. As discussed above, the pressure of the compressed air is higher in comparison with the pressure of the combustion gas. Therefore, an occurrence is suppressed in which the combustion gas passes through the labyrinth forming convex portions 264 and flows into the compressor wheel 222. For the reasons mentioned above, a situation is avoided in which the combusted fuel, for example, enters into the through hole 240 from between both of the wheels 222 and 224.

As shown in FIG. 13, when the output shaft 204 begins to rotate at a high speed, the supply of electrical current from the battery 146 (refer to FIG. 11) to the electromagnetic coils 110 is halted. However, since the turbine wheel 224 is already rotating at a high speed in the manner described above, the rotating shaft 39 rotates at a high speed integrally together with the turbine wheel 224 and the output shaft 204. At this time as well, for the same reasons as mentioned above, a sufficient rotational torque is transmitted from the output shaft 204 with respect to the rotating shaft 39.

As shown in FIG. 3, the direction of rotation of the output shaft 204 and the rotating shaft 39 is preferably opposite to the direction of rotation when the small cap nut 58, the large cap nut 60, and the male threaded portion 252 are screwed together. This is because, in this case, a situation is avoided in which the small cap nut 58, the large cap nut 60, and the male threaded portion 252 become loosened during rotation of the rotating shaft 39. Moreover, it should be noted that the small cap nut 58, the large cap nut 60, or the male threaded portion 252 may also be provided with a mechanism in order to prevent loosening thereof.

Since the rotating shaft 39 retains the magnets 38, the AC current is generated in the electromagnetic coils 110 that surround the magnets 38. Via the U-phase terminal 1441, the V-phase terminal 1442, and the W-phase terminal 1443, the AC current is delivered to the electrical current converter 150 shown in FIG. 2 and FIG. 11. The conversion circuit 152 of the electrical current converter 150 converts such an AC current into a DC current. At a time when the control circuit 156 of the electrical current converter 150 has determined that the output of an external load (for example, a motor) which is electrically connected to the battery 146 has decreased, the DC current is supplied to the battery 146 (refer to FIG. 11) via the capacitor 154. Consequently, charging is carried out on the battery 146.

In this process, within the electrical current converter 150, in particular, the conversion circuit 152 and the capacitor 154 become heated. However, according to the present embodiment, the conversion circuit 152 and the capacitor 154 inside the equipment case 158 are in proximity to the cooling jacket 24. Therefore, the heat of the conversion circuit 152 and the capacitor 154 is rapidly conducted to the cooling medium inside the cooling jacket 24. Consequently, a situation is avoided in which the conversion circuit 152 and the capacitor 154 become excessively high in heat.

Accompanying the electrical current flowing therethrough, the electromagnetic coils 110 generate heat. In this instance, the one portion of the first branched air flow that flows through the first space 853a comes into contact with the left end of the stator 36. The remaining portion of the first branched air flow that flows through the gas flow passage 72 of the accommodation chamber 22 and is directed toward the second space 853b (the second insertion hole 86) comes into contact with the inner wall of the stator 36 and the outer circumference of the rotor 34. The remaining portion of the first branched air flow that flows through the plurality of the cooling passages 41 and toward the second space 853b comes into contact with the interior of the rotor 34. Therefore, the stator 36 and the rotor 34 (the magnets 38) are cooled by the first branched air flow. Further, the cooling medium flows through the cooling jacket 24 that is provided in the main housing 16. The rotating electric machine 12 is rapidly cooled by the cooling medium.

According to the present embodiment, the rotating electric machine housing 14 (the main housing 16) in which the rotating electric machine 12 is accommodated, and the first casing 26 in which the U-phase terminal 1441, the V-phase terminal 1442, and the W-phase terminal 1443 are accommodated are separately provided. Therefore, the influence of heat generated in the stator 36 inside the main housing 16 is less likely to affect the U-phase terminal 1441, the V-phase terminal 1442, and the W-phase terminal 1443 inside the first casing 26. Moreover, along with the electrical current being supplied thereto, the U-phase terminal 1441, the V-phase terminal 1442, and the W-phase terminal 1443 also generate heat. However, the U-phase terminal 1441, the V-phase terminal 1442, and the W-phase terminal 1443 are rapidly cooled by the first branched air flow that is supplied to the first casing 26.

In this manner, the first branched air flow also serves to cool the heat generating locations in the rotating electric machine system 10. From the fact that the electric terminal portions (the U-phase terminal 1441, the V-phase terminal 1442, and the W-phase terminal 1443), the electromagnetic coils 110, the magnets 38, and the like are cooled, a situation is avoided in which the output control and the like of the rotating electric machine system 10 are affected by heat. Further, it is possible to prevent the magnetization of the electromagnetic coils 110, the magnets 38, and the like from deteriorating due to heat. As a result, the reliability of the rotating electric machine system 10 is improved.

Furthermore, from the fact that the main housing 16 in which the rotating electric machine 12 is accommodated, and the first casing 26 in which the U-phase terminal 1441, the V-phase terminal 1442, and the W-phase terminal 1443 are accommodated are individually provided, the rotating electric machine 12 and the electric terminal portions are separated away from each other. Therefore, the U-phase terminal 1441, the V-phase terminal 1442, and the W-phase terminal 1443 are less likely to be affected by the influence of vibrations generated accompany the rotation of the rotor 34. Stated otherwise, the U-phase terminal 1441, the V-phase terminal 1442, and the W-phase terminal 1443 are protected from vibrations. Further, as noted previously, in the first bearing 74 and the second bearing 84, generation of seizure therein is suppressed by the lubricating oil. Accordingly, the rotating electric machine system 10 is superior in terms of durability.

The angle of rotation (the rotational parameter) of the rotating shaft 39 is detected by the resolver 132 while the rotating shaft 39 is undergoing rotation. Specifically, the resolver rotor 56 that is externally fitted onto the left end part 422 of the inner shaft 42 rotates together integrally with the rotating shaft 39. Consequently, electrical signals generated in the resolver stator 130 are transmitted to the receiver via the transmission connector 136. The receiver that has received and read the electrical signals calculates the angle of rotation of the rotating shaft 39 on the basis of the electrical signals. The receiver delivers the calculation result to a non-illustrated control device or the like. The control device or the like obtains the rotational speed by way of a calculation based on the angle of rotation.

The resolver 132 is disposed on the projecting distal end 46 of the rotating shaft 39 that is exposed from the rotating electric machine housing 14. Accordingly, it is less likely for the resolver 132 to be influenced by heat generated in the electromagnetic coils 110 of the stator 36 inside the rotating electric machine housing 14. Further, the resolver 132 is also less likely to be affected by vibrations generated accompanying the rotation of the rotor 34. In addition, the first bearing 74 and the second bearing 84 that support the rotating shaft 39 are provided inside the rotating electric machine housing 14. Accordingly, due to the rotating electric machine housing 14, vibrations of the first bearing 74 and the second bearing 84 are suppressed. This feature as well makes it unlikely for the influence of such vibrations to reach the resolver 132.

According to the present embodiment, for example, the third sub-branching passage 941 and the fourth sub-branching passage 942 are provided. Alternatively, the first branching passage L may branch off into a first sub-branching passage and a second sub-branching passage. In this case, the one portion of the first branched air flow is supplied from the first sub-branching passage to the first distal end 781, and further, the remaining portion of the first branched air flow is supplied from the second sub-branching passage to the first proximal end 782. Alternatively, the first branching passage L may be branched off into the first sub-branching passage and the second sub-branching passage, and in addition, the third sub-branching passage 941 and the fourth sub-branching passage 942 may be provided.

In the gas turbine engine 200, the compressor wheel 222 and the turbine wheel 224 can also be arranged in a reverse order to that shown in FIG. 13. In this case, the through hole 240 is formed in the turbine wheel 224, and the output shaft 204 is provided in the compressor wheel 222. Apart therefrom, the compressor wheel 222 and the turbine wheel 224 may be of a centrifugal type or an axial flow type. If the compressor wheel 222 and the turbine wheel 224 are arranged on the same axis, a combination of a multi-stage compressor wheel and a multi-stage turbine wheel, which is a combination of a centrifugal type and an axial flow type, may be used.

In FIG. 3, the rotating electric machine 12 that makes up the rotating electric machine system 10 may be a motor that rotates the rotating shaft 39 by supplying an electrical current to the electromagnetic coils 110. In this case, the U-phase terminal 1441, the V-phase terminal 1442, and the W-phase terminal 1443 serve as electric terminal portions that receive the electrical power from the battery 146.

Figure 15:
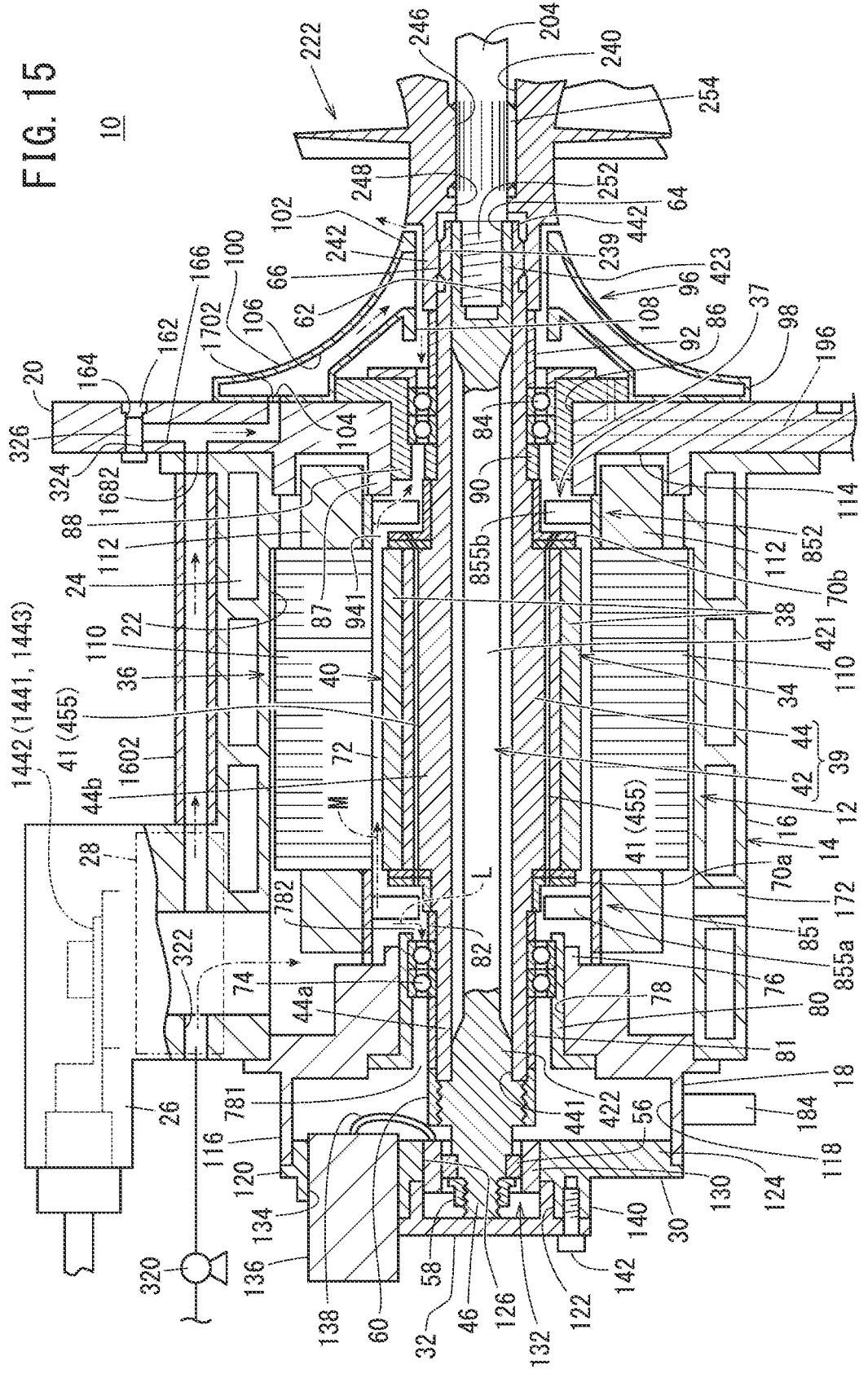
FIG. 15 is a schematic side cross-sectional view of a case of using an externally provided compression pump as a gas supply source.

In the embodiment described above, a mode is exemplified in which one portion of the compressed air generated by the gas turbine engine 200 is supplied to the rotating electric machine housing 14. Alternatively, as shown in FIG. 15, an externally provided compression pump 320 or the like may be used as the gas supply source.

In this case, for example, a communication hole 322 is formed in the first casing 26. The compressed air supplied from the compression pump 320 flows into this communication hole 322. Also, a communication hole 324, which is continuous with the upstream communication holes 164, is formed in the second sub-housing 20. The communication hole 324 is closed with a plug 326. In this state, the compression pump 320 compresses the atmospheric air or the like, whereby the compressed air is obtained. The compressed air is supplied to the first hollow tube portion 1601 to the third hollow tube portion 1603.

In this case, the entire amount of the compressed air can be used as the combustion air.

In the foregoing manner, according to the present embodiment, the rectifying structure 37 is provided in which the cooling passages 41 through which the compressed air for cooling flows are provided in the interior of the rotor 34 of the rotating electric machine system 10, and in which the plurality of the inlet side fins 855a and the plurality of the outlet side fins 855b are provided. The rectifying structure 37 is arranged in facing relation to the first and second opening portions 411 and 412 of the cooling passages 41, and the rectifying structure 37 is fixed to the non-rotating portion within the main housing 16.

Consequently, in comparison with a structure in which a suction fan is provided in the interior of the rotor 34, it is possible to suppress an increase in size in the radial direction of the rotor 34, and together therewith, to suppress the generation of vibrations in the rotor 34 at a time when the rotor 34 is rotated. Since the compressed air is rectified by the rectifying structure 37, the compressed air can be made to smoothly flow through the cooling passages 41 and thereby cool the rotor 34.

The first and second opening portions 411 and 412 are offset in the radial direction from the center of rotation of the rotor 34, and the plurality of inlet side fins 855a and the plurality of outlet side fins 855b are arranged at intervals in the circumferential direction of the rotor 34. In accordance with this feature, the compressed air can be effectively rectified by the plurality of the inlet side fins 855a and the plurality of the outlet side fins 855b.

The plurality of the cooling passages 41 are arranged in a manner so as to be equally spaced apart from each other in the circumferential direction of the rotor 34, and the plurality of the inlet side fins 855a and the plurality of the outlet side fins 855b of each of the cooling passages 41 face toward each other, with respect to the first and second virtual circles D1 and D2 connecting the plurality of the first and second opening portions 411 and 412. In accordance with such features, since the plurality of the inlet side fins 855a and the plurality of the outlet side fins 855b are arranged on the first and second virtual circles D1 and D2 in corresponding relation to the arrangement of the plurality of first and second opening portions 411 and 412, it is possible for the compressed air that flows through the cooling passages 41 to effectively cool the rotor 34.

The rotor 34 includes the enlarged diameter portion 40 which is enlarged in diameter from the main body portion 44a. The first opening portions 411 open on the first wall surface 44c of the enlarged diameter portion 40. The second opening portions 412 open on the second wall surface 44d of the enlarged diameter portion 40. The plurality of the inlet side fins 855a and the plurality of the outlet side fins 855b and the first and second wall surfaces 44c and 44d face respectively toward each other in the axial direction. In accordance with such features, the rectifying structure 37 in which the inlet side fins 855a and the outlet side fins 855b are included can be arranged closer to the first and second opening portions 411 and 412 of the cooling passages 41. Therefore, the rectifying structure 37 is capable of more effectively rectifying the compressed air.

By providing the outlet side rectifying member 852 that faces toward the outlets 414 (the second opening portions 412) of the cooling passages 41, the compressed air that has flowed out from the outlets 414 of the cooling passages 41 is prevented from remaining inside the second space 853b. Therefore, flowing through of the compressed air in the cooling passages 41 is promoted, and in accordance therewith, the rotor 34 can be efficiently cooled.

The outlet side rectifying member 852 includes the plurality of the outlet side fins 855b that serve to rectify the flow of the compressed air flowing out from the outlets 414 of the cooling passages 41 in the axial direction of the rotor 34. In accordance with this feature, swirling of the compressed air that has flowed out from the cooling passages 41 inside the second space 853b is suppressed. Therefore, retention of the compressed air can be effectively suppressed.

Each of the plurality of the outlet side fins 855b includes the direction changing portions 857b which are curved in a manner so as to change the direction in the axial direction of the rotor 34 toward a downstream side. In accordance with this feature, by the direction changing portions 857b, the flow of the compressed air flowing out from the outlets 414 of the cooling passages 41 into the second space 853b can be effectively rectified toward the axial direction of the rotor 34.

By providing the inlet side rectifying member 851 that faces toward the inlets 413 (the first opening portions 411) of the cooling passages 41, since flowing in of the compressed air from the inlets 413 into the cooling passages 41 is promoted, the rotor 34 can be efficiently cooled.

The inlet side rectifying member 851 includes the plurality of the inlet side fins 855a that rectify the flow of the compressed air in the circumferential direction of the rotor 34. In accordance with this feature, since flowing of the compressed air into the cooling passages 41 is promoted, the rotor 34 can be efficiently cooled.

Each of the plurality of the inlet side fins 855a includes the direction changing portions 857a which are curved in a manner so as to change the direction in the direction of rotation of the rotor 34 toward the downstream side. In accordance with this feature, by the direction changing portions 857a, the flow of the compressed air from the first space 853a to the inlets 413 of the cooling passages 41 can be effectively rectified toward the circumferential direction of the rotor 34. At the time when the rotor 34 is rotating, the compressed air can be efficiently introduced into the cooling passages 41 of the rotor 34.

By providing the inlet side rectifying member 851 that faces toward the inlets 413 of the cooling passages 41, and the outlet side rectifying member 852 that faces toward the outlets 414 of the cooling passages 41, both the flow of the compressed air that flows into the cooling passages 41, and the flow of the compressed air that flows out from the cooling passages 41 can be rectified together. Therefore, by the compressed air that flows through the cooling passages 41, it is possible to more efficiently cool the rotor 34.

By the rectifying structure 37 being arranged in facing relation to the gas flow passage 72 between the rotor 34 and the stator 36, in addition to the compressed air that flows through the cooling passages 41, the compressed air that flows through the gas flow passage 72 can be rectified. Therefore, the rotor 34 can be efficiently cooled by the compressed air that flows through the cooling passages 41 and the gas flow passage 72.

The above-described embodiment can be summarized in the following manner.

The above-described rotating electric machine system (10) includes the rotor (34) including the magnet (38), the stator (36) configured to surround the rotor, the housing (14) in which the rotor and the stator are accommodated, and configured to rotatably support the rotor, wherein, on at least one of an interior or an outer circumferential portion of the rotor, the cooling passage (41 and 72) is provided through which there flows the cooling gas supplied from the gas supplying mechanism which is provided separately from the rotor, the rotating electric machine system further includes the rectifying structure (37) including the plurality of fins (855a and 855b) configured to rectify the flow of the gas, and the rectifying structure is fixed to a non-rotating portion inside the housing in a manner so as to face toward the cooling passage.

The cooling passage includes the rotor internal cooling passage (41) disposed in the interior of the rotor, the rotor internal cooling passage includes the opening portion (411 and 412) configured to open on the outer surface of the rotor, the opening portion is offset in a radial direction from the axial center of rotation of the rotor, and opens on the outer surface of the rotor, and the plurality of fins are arranged at intervals in the circumferential direction of the rotor in a manner so as to surround the axial center of rotation of the rotor.

The rotor internal cooling passage includes the plurality of rotor internal cooling passages, and the plurality of rotor internal cooling passages are arranged in the rotor in a manner so as to be equally spaced apart from each other in the circumferential direction of the rotor, and the plurality of fins face toward, in the axial direction of the rotor, the virtual circle (D1 and D2) connecting the plurality of the opening portions of the rotor internal cooling passages.

The rotor includes the main body portion (44a) supported in the housing, and the enlarged diameter portion (40) arranged at the intermediate portion between the one end part and the other end part of the main body portion in the axial direction of the rotor, and enlarged in diameter outwardly in the radial direction from the main body portion, the opening portion opens on the end surface (44c and 44d) of the enlarged diameter portion in the axial direction, and the plurality of fins and the enlarged diameter portion face toward each other in the axial direction.

The opening portion includes the inlet (413) and the outlet (414) of the rotor internal cooling passage, and the rectifying structure includes the outlet side rectifying member (852) facing toward the outlet.

The outlet side rectifying member includes the plurality of outlet side fins (855b) configured to rectify the flow of the gas flowing out from the outlet, in the axial direction of the rotor.

Each of the plurality of outlet side fins includes the direction changing portion (857b) configured to curve in a manner so as to change the direction in the axial direction of the rotor toward the downstream side.

The opening portion includes the inlet and the outlet of the rotor internal cooling passage, and the rectifying structure includes the inlet side rectifying member (851) facing toward the inlet.

The inlet side rectifying member includes the plurality of inlet side fins (855a) configured to rectify the flow of the gas, in the circumferential direction of the rotor.

Each of the plurality of inlet side fins includes the direction changing portion (857a) configured to curve in a manner so as to change the direction in the direction of rotation of the rotor toward the downstream side.

The opening portion includes the inlet and the outlet of the rotor internal cooling passage, and the rectifying structure includes the inlet side rectifying member facing toward the inlet, and the outlet side rectifying member facing toward the outlet.

The cooling passage includes the gas flow passage (72) disposed between the rotor and the stator and through which the gas flows, and the rectifying structure faces toward at least one of the upstream side or the downstream side of the gas flow passage.

Moreover, it should be noted that the present invention is not limited to the disclosure described above, but various configurations may be adopted therein without departing from the essence and gist of the present invention.

The invention claimed is:

1. A rotating electric machine system comprising:
a rotor including a magnet;
a stator configured to surround the rotor;
a housing in which the rotor and the stator are accommodated, and configured to rotatably support the rotor,
wherein, on at least one of an interior or an outer circumferential portion of the rotor, a cooling passage is provided through which there flows a cooling gas supplied from a gas supplying mechanism which is provided separately from the rotor;
the rotating electric machine system further comprises a rectifying structure including a plurality of fins configured to rectify flow of the gas;
the rectifying structure is fixed to a non-rotating portion inside the housing in a manner so as to face toward the cooling passage;
the cooling passage includes:
a rotor internal cooling passage disposed in the interior of the rotor, and
a gas flow passage disposed between the rotor and the stator and through which the gas flows;
each of the plurality of fins directly face each of the rotor internal cooling passage and the gas flow passage in an axial direction of the rotor;
a first space that is provided on an upstream side of the gas flow passage and the rotor internal cooling passage and communicates with each of the gas flow passage and the rotor internal cooling passage, and
a second space that is provided on a downstream side of the gas flow passage and the rotor internal cooling passage and communicates with each of the gas flow passage and the rotor internal cooling passage,
wherein
the gas supplied to the first space branches and flows into the gas flow passage and the rotor internal cooling passage,
the gas flowing through each of the gas flow passage and the rotor internal cooling passage merges at the second space, and
each of the plurality of fins is disposed in the first space and the second space.

2. The rotating electric machine system according to claim 1, wherein:

the rotor internal cooling passage includes an opening portion configured to open on an outer surface of the rotor;
the opening portion is offset in a radial direction from an axial center of rotation of the rotor, and opens on the outer surface of the rotor, and
the plurality of fins are arranged at intervals in a circumferential direction of the rotor in a manner so as to surround the axial center of rotation of the rotor.

3. The rotating electric machine system according to claim 2, wherein:
the rotor internal cooling passage comprises a plurality of the rotor internal cooling passages, and the plurality of rotor internal cooling passages are arranged in the rotor so as to be equally spaced apart from each other in the circumferential direction of the rotor; and
the plurality of fins face toward, in the axial direction of the rotor, a virtual circle connecting a plurality of the opening portions of the rotor internal cooling passages.

4. The rotating electric machine system according to claim 2, wherein:
the rotor includes a main body portion supported in the housing, and an enlarged diameter portion arranged at an intermediate portion between one end part and another end part of the main body portion in the axial direction of the rotor, and enlarged in diameter outwardly in the radial direction from the main body portion;
the opening portion opens on an end surface of the enlarged diameter portion in the axial direction; and
the plurality of fins and the enlarged diameter portion face toward each other in the axial direction.

5. The rotating electric machine system according to claim 2, wherein:
the opening portion includes an inlet and an outlet of the rotor internal cooling passage; and
the rectifying structure includes an outlet side rectifying member facing toward the outlet.

6. The rotating electric machine system according to claim 5, wherein the outlet side rectifying member includes a plurality of outlet side fins configured to rectify the flow of the gas flowing out from the outlet, in the axial direction of the rotor.

7. The rotating electric machine system according to claim 6, wherein each of the plurality of outlet side fins includes a direction changing portion configured to curve in a manner so as to change a direction in the axial direction of the rotor toward a downstream side.

8. The rotating electric machine system according to claim 2, wherein:
the opening portion includes an inlet and an outlet of the rotor internal cooling passage; and
the rectifying structure includes an inlet side rectifying member facing toward the inlet.

9. The rotating electric machine system according to claim 8, wherein the inlet side rectifying member includes a plurality of inlet side fins configured to rectify the flow of the gas, in the circumferential direction of the rotor.

10. The rotating electric machine system according to claim 9, wherein each of the plurality of inlet side fins includes a direction changing portion configured to curve in a manner so as to change a direction in a direction of rotation of the rotor toward a downstream side.

11. The rotating electric machine system according to claim 2, wherein:
the opening portion includes an inlet and an outlet of the rotor internal cooling passage; and the rectifying structure includes an inlet side rectifying member facing toward the inlet; and an outlet side rectifying member facing toward the outlet.

12. The rotating electric machine system according to claim 1, wherein:

the plurality of fins of the rectifying structure faces toward at least one of an upstream side or a downstream side of the gas flow passage.

13. The rotating electric machine system according to claim 1, wherein each of the plurality of fins includes a plurality of inlet side fins that rectify, from the axial direction to a circumferential direction, flow of the gas supplied to the cooling passage, and a plurality of outlet side fins that rectify, in the axial direction, flow of the gas flowing out from an outlet of the cooling passage, wherein each of the plurality of inlet side fins includes a first upstream end that is provided on an upstream side in the axial direction, a first downstream end that is provided on a downstream side in the axial direction, and an inlet side direction changing portion that is curved to face toward a direction of rotation of the rotor from the first upstream end toward the first downstream end in the axial direction, each of the plurality of outlet side fins includes a second upstream end that is provided on an upstream side in the axial direction, a second downstream end that is provided on a downstream side in the axial direction, and an outlet side direction changing portion that is curved to face toward a direction opposite to the direction of rotation of the rotor from the second downstream end toward the second upstream end in the axial direction.

* * * * *